United States Patent [19]

Naka et al.

[11] Patent Number: 5,411,272
[45] Date of Patent: May 2, 1995

[54] VIDEO GAME WITH SPIRAL LOOP GRAPHICS

[75] Inventors: Yuji Naka, Mountain View; Masanobu Yamamoto, Foster City, both of Calif.

[73] Assignee: Sega of America, Inc., Redwood City, Calif.

[21] Appl. No.: 155,031

[22] Filed: Nov. 18, 1993

Related U.S. Application Data

[63] Continuation-in-part of Ser. No. 979,570, Nov. 20, 1992, abandoned.

[51] Int. Cl.⁶ .............................................. A63F 9/22
[52] U.S. Cl. ............................ 273/437; 345/122; 345/126; 395/137; 395/152
[58] Field of Search ............... 273/433, 434, 435, 436, 273/437, 438, 454, 460, 85 G, 148 B, DIG. 28; 364/410, 411, 412; 395/100, 118, 133, 137, 152, 162, 163; 345/119, 120, 121, 122, 126, 127, 112, 114, 115

[56] References Cited

U.S. PATENT DOCUMENTS

| | | | |
|---|---|---|---|
| Re. 33,662 | 8/1991 | Blair et al. | 364/410 |
| 4,026,555 | 5/1977 | Kirschner et al. | 273/85 R |
| 4,445,114 | 4/1984 | Stubben | 340/726 |
| 4,508,353 | 4/1985 | Meyer et al. | 273/313 |
| 4,530,499 | 7/1985 | Breslow et al. | 273/434 |
| 4,643,421 | 2/1987 | Meyer et al. | 273/434 |
| 4,658,247 | 4/1987 | Gharachorloo | 340/747 |
| 4,738,451 | 4/1988 | Logg | 273/153 R |
| 4,951,038 | 8/1990 | Yamamura | 345/126 |
| 5,090,708 | 2/1992 | Gerlitz et al. | 273/310 |
| 5,120,057 | 6/1992 | Kitaue | 273/85 G |
| 5,125,671 | 6/1992 | Ueda et al. | 273/437 |
| 5,150,899 | 9/1992 | Kitaue | 273/85 G |
| 5,327,158 | 7/1994 | Takahashi et al. | 345/126 |

FOREIGN PATENT DOCUMENTS 2245186A 1/1992 United Kingdom.

OTHER PUBLICATIONS

"Bonk", Cratermaze & Galaga '90, from *Official Turbo Graft 16 Game Encyclopedia*, Bantam Book, Nov. 1990.
Sega Game Instruction Manual for the "Toejam & Earl" video game cartridge for use in the Sega Game System.

*Primary Examiner*—Jessica J. Harrison
*Attorney, Agent, or Firm*—Wilson, Sonsini, Goodrich & Rosati

[57] ABSTRACT

A method is provided for controlling the appearance of a video game game character, as the character traverses a path displayed on a display screen; wherein the method is used in a video game system which includes a graphics controller, digital memory and a display screen, the method comprises the steps of: displaying a banked path segment in which the game character is displayed upright at at least one location on the banked path and is displayed upside down at at least one other location on this banked path; storing multiple sprite patterns representative of the appearance of the character at different locations on the banked path as the character traverses the banked path; tracking the character location on the banked path as the character traverses the banked path; retrieving the stored sprite patterns that portray the character at different locations on the banked path; and displaying a character using the retrieved patterns such that the character has different appearances at different locations on the banked path.

10 Claims, 46 Drawing Sheets

|   | 1 | 2 | 3 | 4 | 5 | 6 | 7 | 8 |
|---|---|---|---|---|---|---|---|---|
| a | □ | □ | □ | □ | □ | □ | □ | □ |
| b | □ | □ | □ | □ | □ | □ | □ | □ |
| c | □ | □ | □ | □ | □ | □ | □ | □ |
| d | □ | □ | □ | □ | □ | □ | □ | □ |
| e | □ | □ | □ | □ | □ | □ | □ | □ |
| f | □ | □ | □ | □ | □ | □ | □ | □ |
| g | □ | □ | □ | □ | □ | □ | □ | □ |
| h | □ | □ | □ | □ | □ | □ | □ | □ |

FIG.−4

|    | 0 | | 1 | | 2 | | 3 | |
|----|----|----|----|----|----|----|----|----|
|    | D7 | D0 | D7 | D0 | D7 | D0 | D7 | D0 |
| 00 | a1 | a2 | a3 | a4 | a5 | a6 | a7 | a8 |
| 04 | b1 | b2 | b3 | b4 | b5 | b6 | b7 | b8 |
| 08 | c1 | c2 | c3 | c4 | c5 | c6 | c7 | c8 |
| 0C | d1 | d2 | d3 | d4 | d5 | d6 | d7 | d8 |
| 10 | e1 | e2 | e3 | e4 | e5 | e6 | e7 | e8 |
| 14 | f1 | f2 | f3 | f4 | f5 | f6 | f7 | f8 |
| 18 | g1 | g2 | g3 | g4 | g5 | g6 | g7 | g8 |
| 1C | h1 | h2 | h3 | h4 | h5 | h6 | h7 | h8 |

FIG.−5A

| D7 | D6 | D5 | D4 | D3 | D2 | D1 | D0 |
|----|----|----|----|----|----|----|----|
| COL3 | COL2 | COL1 | COL0 | COL3 | COL2 | COL1 | COL0 |

FIG.−5B

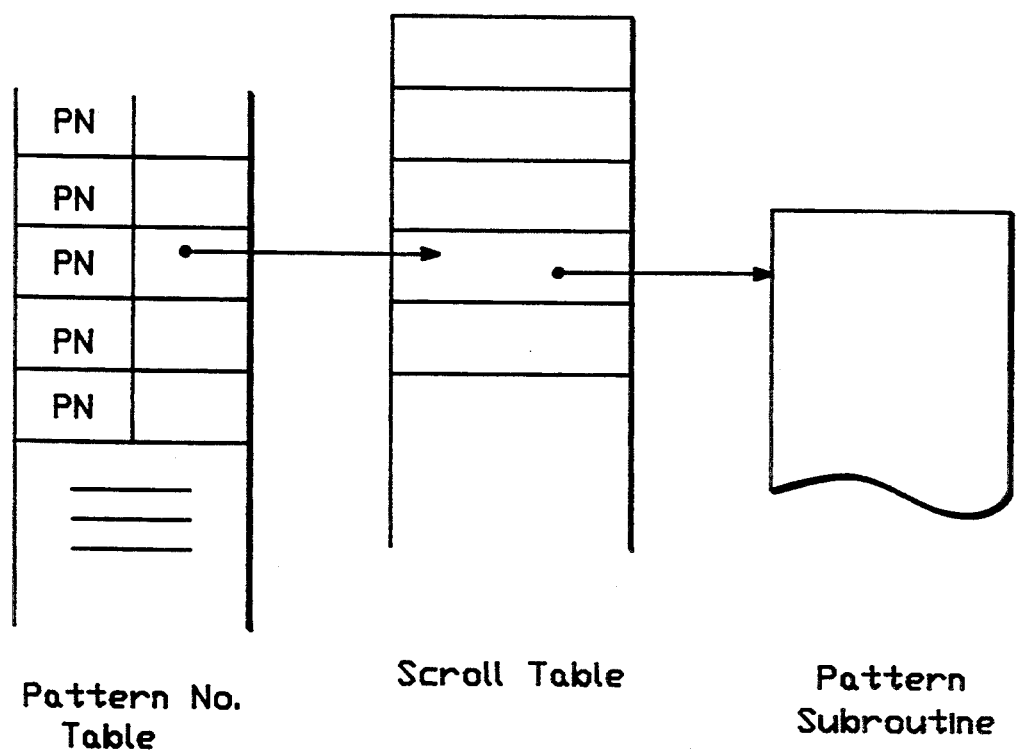
FIG.—6

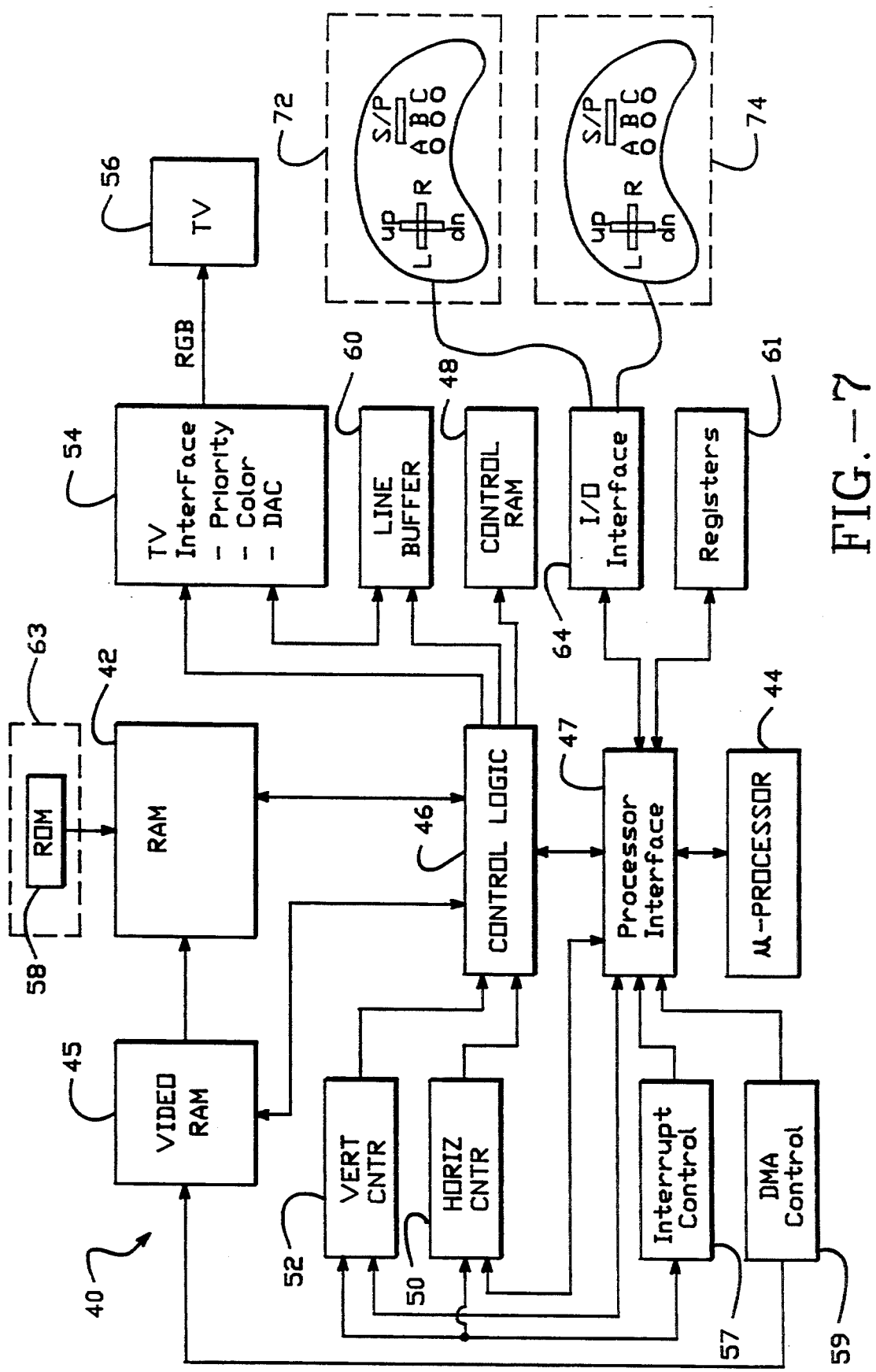

| VERTICAL POS'N |  |
|---|---|
| Size | Link No. |
| Pattern No. |  |
| Vertical Pos'n |  |
|  |  |

CONTROL RAM SPRITE TABLE

FIG.—10

2. SPRITE ATTRIBUTE

Sprite Attribute Table is on VRAM and the Base Address is designated by Register. Attribute requires 8 byte (4 words) per Sprite, and indicates Display Position, Priority, Sprite Generator Number, and Attribute.

Starting from the begining of the Attribute Table, number are given in the sequence of Sprite 0, Sprite 1, Sprite 2, Sprite 3, etc. Priority between Sprites is not determined by the sequence of Sprite number, but by each Sprite's Link Data, and thus becomes programmable.

| | | | | | | | | | |
|---|---|---|---|---|---|---|---|---|---|
| 1st | | | vp7 | vp6 | vp5 | vp4 | vp3 | vp2 | vp1 vp0 ⟨D15–D8⟩ ⟨D7–D0⟩ (with vp8, vp9) |
| 2nd | | | | | | hs1 hs0 | ld3 | vs1 vs0 | ld1 ld0 ⟨D15–D8⟩ ⟨D7–D0⟩ |
| 3rd | pn cp1 cp0 | | | vf hf | sn10 sn9 sn8 | sn3 | sn2 | sn1 sn0 ⟨D15–D8⟩ ⟨D7–D0⟩ |
| 4th | | | hp7 hp6 | hp5 | hp4 | hp3 | hp2 | hp1 hp0 ⟨D15–D8⟩ ⟨D7–D0⟩ (with hp8) |

SPRITE ATTRIBUTE TABLE ENTRY

FIG.–11

| S prt | A prt | B prt | Priority |
|---|---|---|---|
| 0 | 0 | 0 | S>A>B |
| 1 | 0 | 0 | S>A>B |
| 0 | 1 | 0 | A>S>B |
| 1 | 1 | 0 | S>A>B |
| 0 | 0 | 1 | B>S>A |
| 1 | 0 | 1 | S>B>A |
| 0 | 1 | 1 | A>B>S |
| 1 | 1 | 1 | S>A>B |

S: Sprite
A: Scroll A
B: Scroll B

FIG. —12

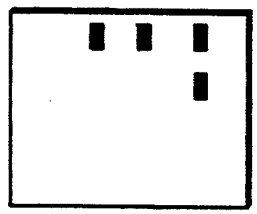
vf = 1
hf = 1
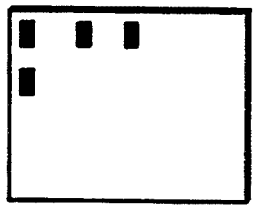
vf = 0
hf = 1
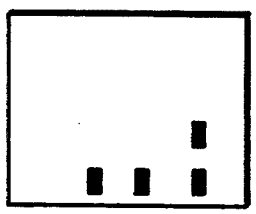
vf = 1
hf = 0
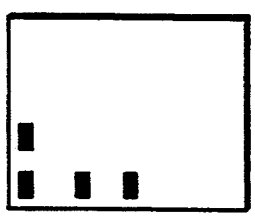
vf = 0
hf = 0
FIG.—13

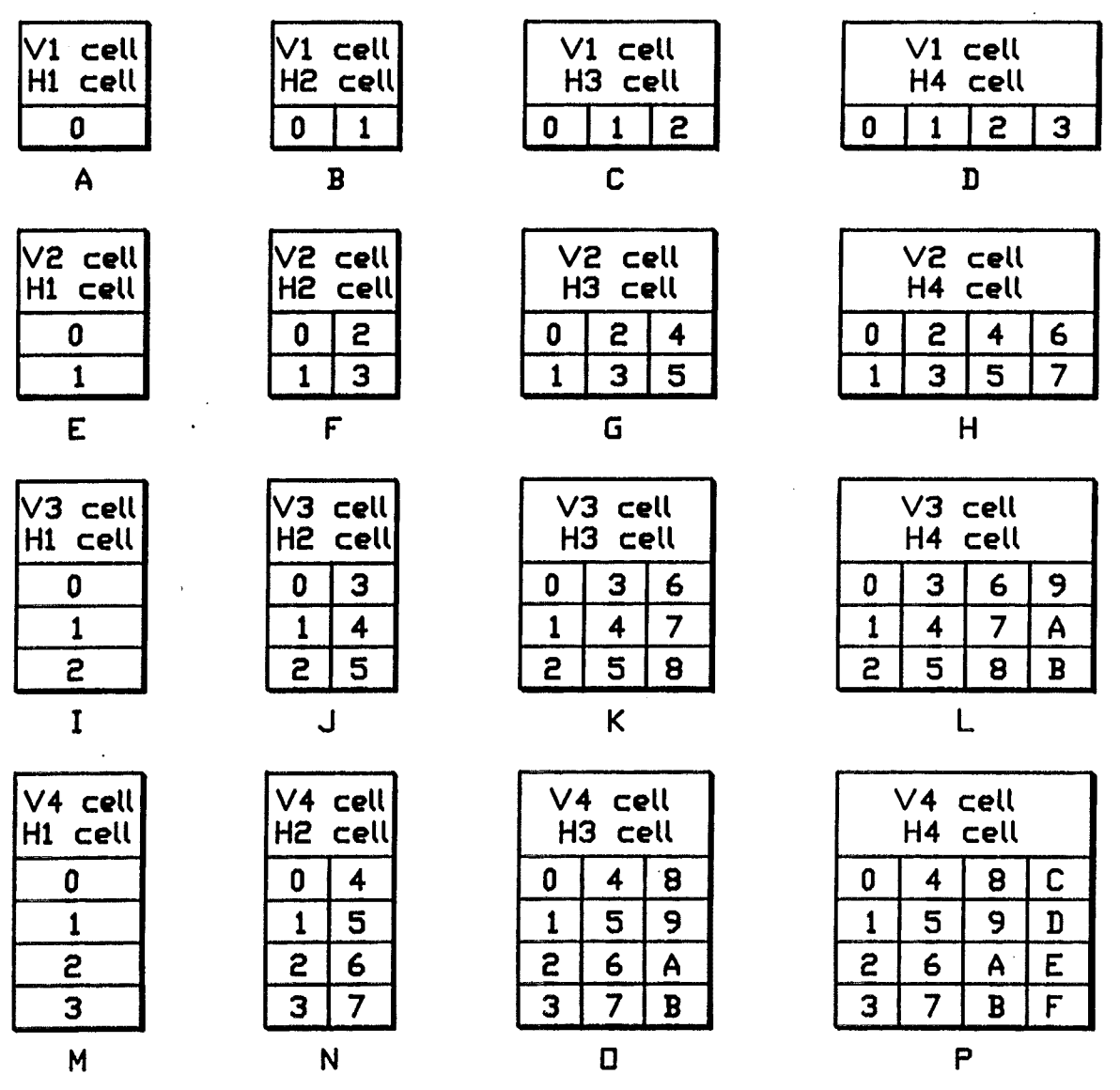

FIG.—15

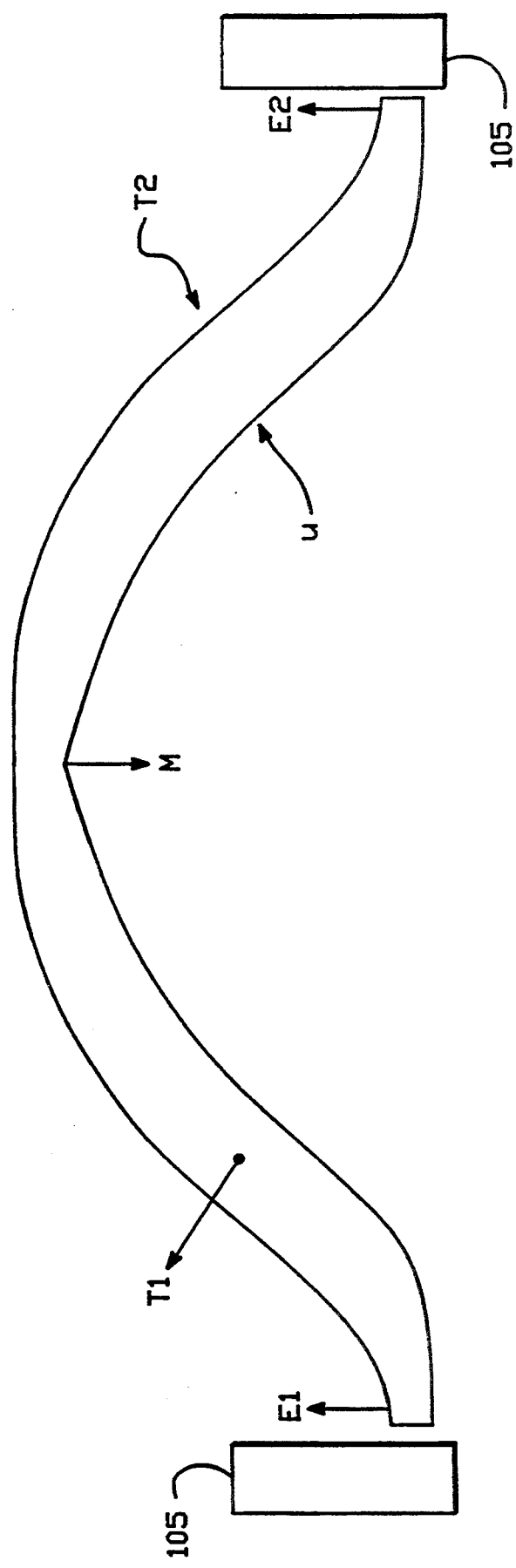
FIG.—16A

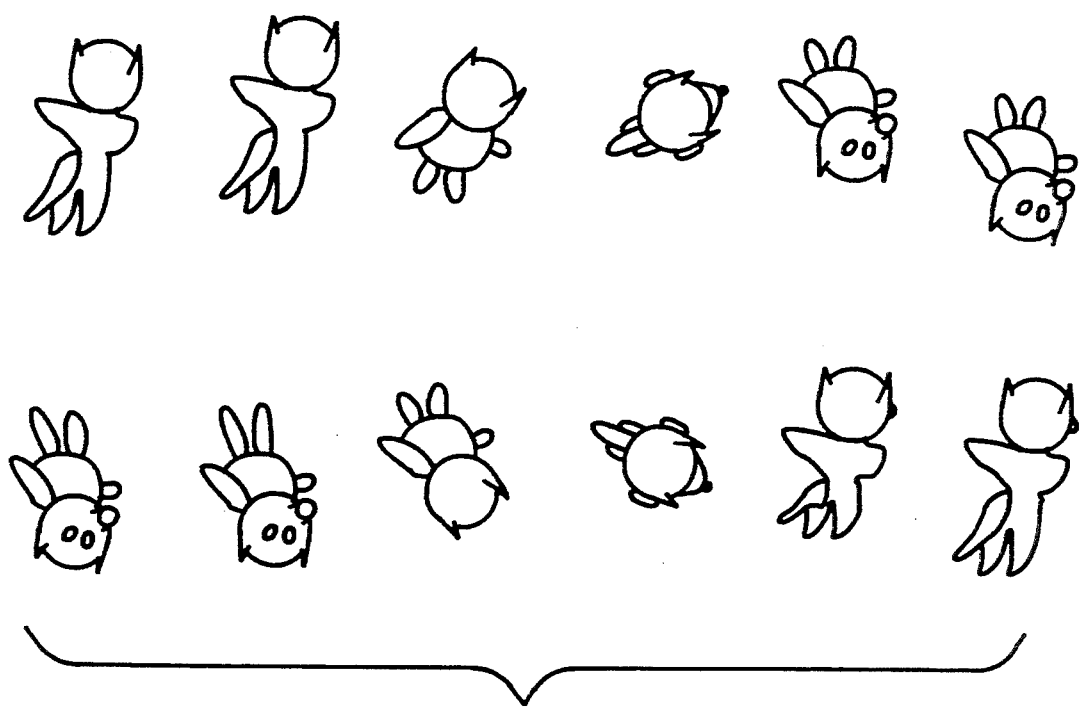
FIG.—17

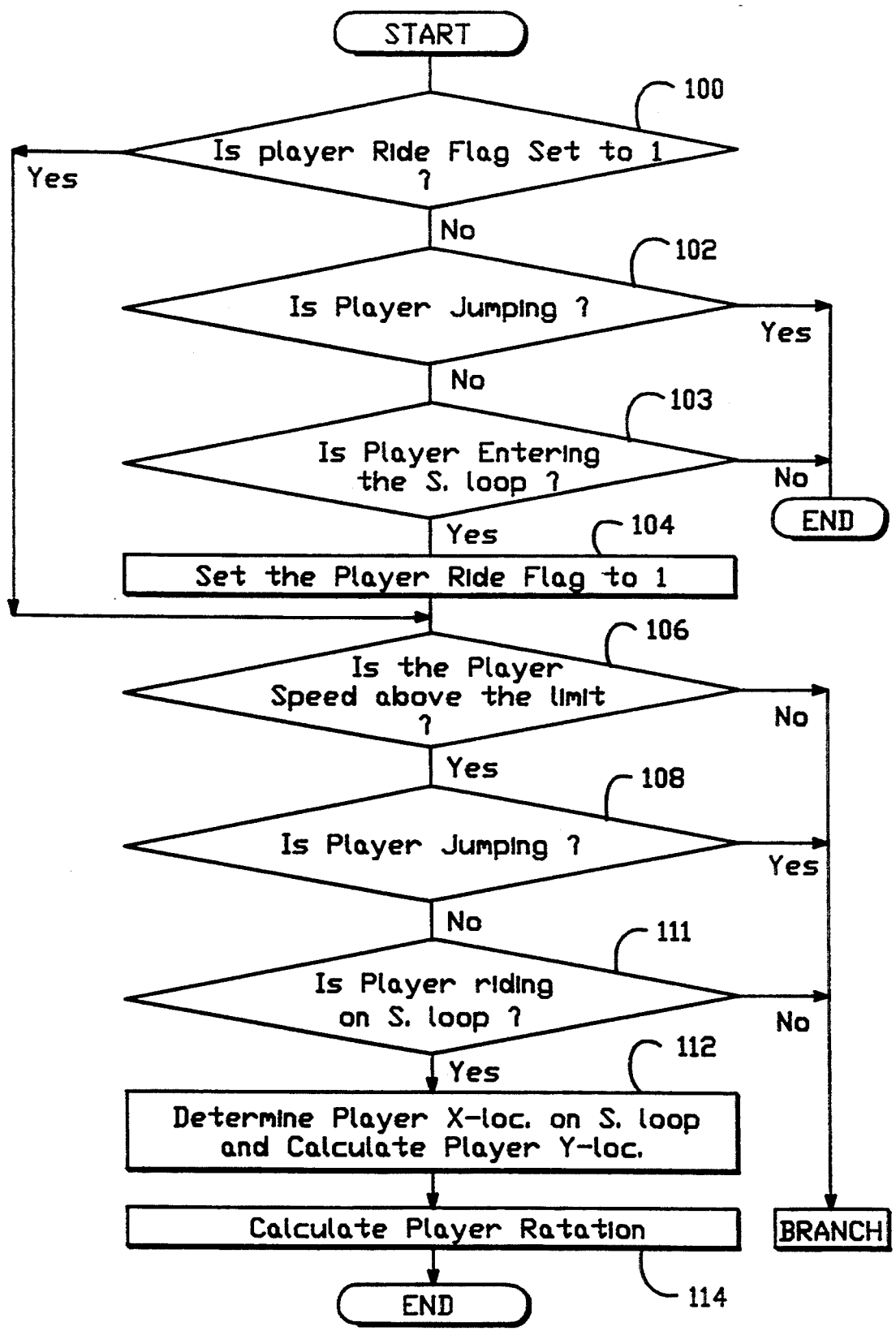
FIG.—18A

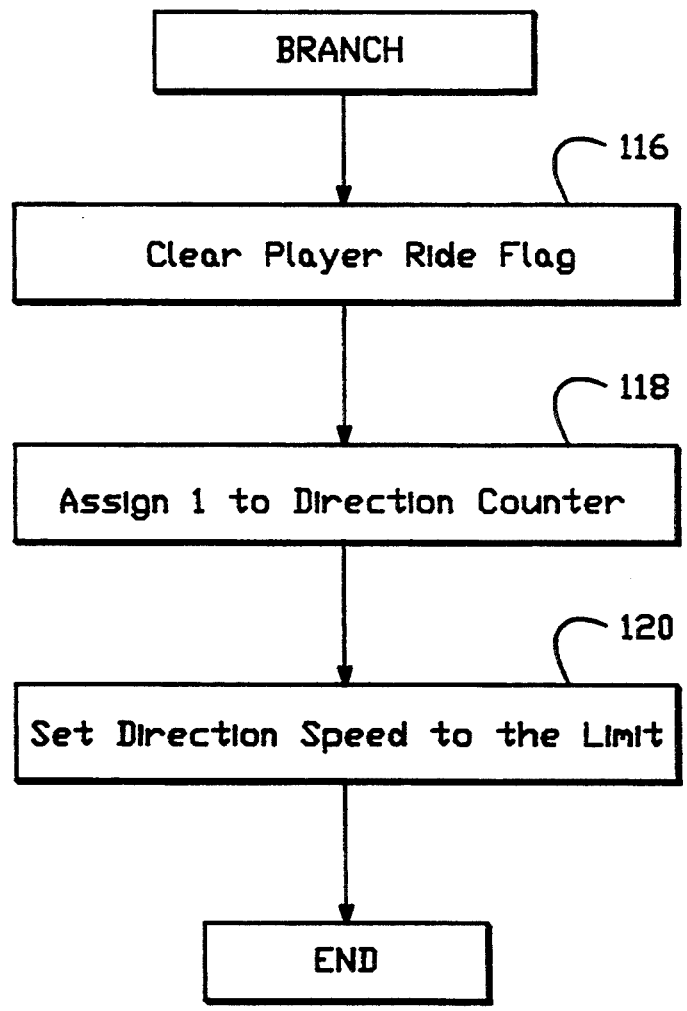
FIG.—18B

```
sloopdirtbl:
        dc.b    S00,S00                                 Table of
        dc.b    S01,S01,S16,S16,S16,S16,S2c,S2c         Angles
        dc.b    S2c,S2c,S42,S42,S42,S42,S58,S58
        dc.b    S58,S58,S6e,S6e,S6e,S6e,S84,S84,
        dc.b    S84,S84,S9a,S9a,S9a,S9a,Sb0,Sb0,
        dc.b    Sb0,Sb0,Sc6,Sc6,Sc6,Sc6,Sdc,Sdc,
        dc.b    Sdc,Sdc,Sf2,Sf2,Sf2,Sf2,S01,S01
        dc.b    S00,S00 slooptbl:                                               Entry
                                                        Points
        dc.b    032,032,032,032,032,032,032,032         (E1)
        dc.b    032,032,032,032,032,032,032,032
                                                        Begin
        dc.b    032,032,032,032,032,032,032,032         Offset
        dc.b    032,032,032,032,032,032,031,031         Table
        dc.b    031,031,031,031,031,031,031,031
        dc.b    031,031,031,031,031,030,030,030 dc.b    030,030,030,030,030,030,029,029
        dc.b    029,029,029,028,028,028,028,027
        dc.b    027,027,027,026,026,026,025,025
        dc.b    025,024,204,024,023,023,022,022 dc.b    021,021,020,020,019,018,018,017
        dc.b    016,016,015,014,014,013,012,012
        dc.b    011,010,010,009,008,008,007,006
        dc.b    006,005,004,004,003,002,002,001 dc.b    000,-01,-02,-02,-03,-04,-04,-05
        dc.b    -06,-07,-07,-08,-09,-09,-10,-10,
        dc.b    -11,-11,-12,-12,-13,-14,-14,-15
        dc.b    -15,-16,-16,-17,-17,-18,-18,-19 dc.b    -19,-19,-20,-21,-21,-22,-22,-23
        dc.b    -23,-24,-24,-25,-25,-26,-26,-27
        dc.b    -27,-28,-28,-28,-29,-29,-30,-30
        dc.b    -30,-31,-31,-31,-32,-32,-32,-33 dc.b    -33,-33,-33,-34,-34,-34,-35,-35
        dc.b    -35,-35,-35,-35,-35,-35,-36,-36
        dc.b    -36,-36,-36,-36,-36,-36,-36,-37
        dc.b    -37,-37,-37,-37,-37,-37,-37,-37
```

FIG.—19A

| | |
|---|---|
| dc.b | −37,−37,−37,−37,−37,−37,−37,−37, |
| dc.b | −37,−37,−37,−37,−37,−37,−37,−37 |
| dc.b | −37,−37,−37,−37,−36,−36,−36,−36 |
| dc.b | −36,−36,−36,−35,−35,−35,−35,−35 |
| dc.b | −35,−35,−35,−34,−34,−34,−33,−33 |
| dc.b | −33,−33,−32,−32,−32,−31,−31,−31 |
| dc.b | −30,−30,−30,−29,−29,−28,−28,−28 |
| dc.b | −27,−27,−26,−26,−25,−25,−24,−24 |
| dc.b | −23,−23,−22,−22,−21,−21,−20,−19 |
| dc.b | −19,−18,−18,−17,−16,−16,−15,−14 |
| dc.b | −14,−13,−12,−11,−11,−10,−09,−08 |
| dc.b | −07,−07,−06,−05,−04,−03,−02,−01 |
| dc.b | 000,001,002,003,004,005,006,007 |
| dc.b | 008,008,009,010,010,011,012,013 |
| dc.b | 013,014,014,015,015,016,016,017 |
| dc.b | 017,018,018,019,019,020,020,021 |
| dc.b | 021,022,022,023,023,024,024,024, |
| dc.b | 025,025,025,025,026,026,026,026 |
| dc.b | 027,027,027,027,028,028,028,028 |
| dc.b | 028,028,029,029,029,029,029,029 |
| dc.b | 029,030,030,030,030,030,030,030 |
| dc.b | 031,031,031,031,031,031,031,031 |
| dc.b | 031,031,032,032,032,032,032,032 |
| dc.b | 032,032,032,032,032,032,032,032   End Offset Table |
| dc.b | 032,032,032,032,032,032,032,032   Entry Points (E2) |
| dc.b | 032,032,032,032,032,032,032,032 |

FIG.−19B

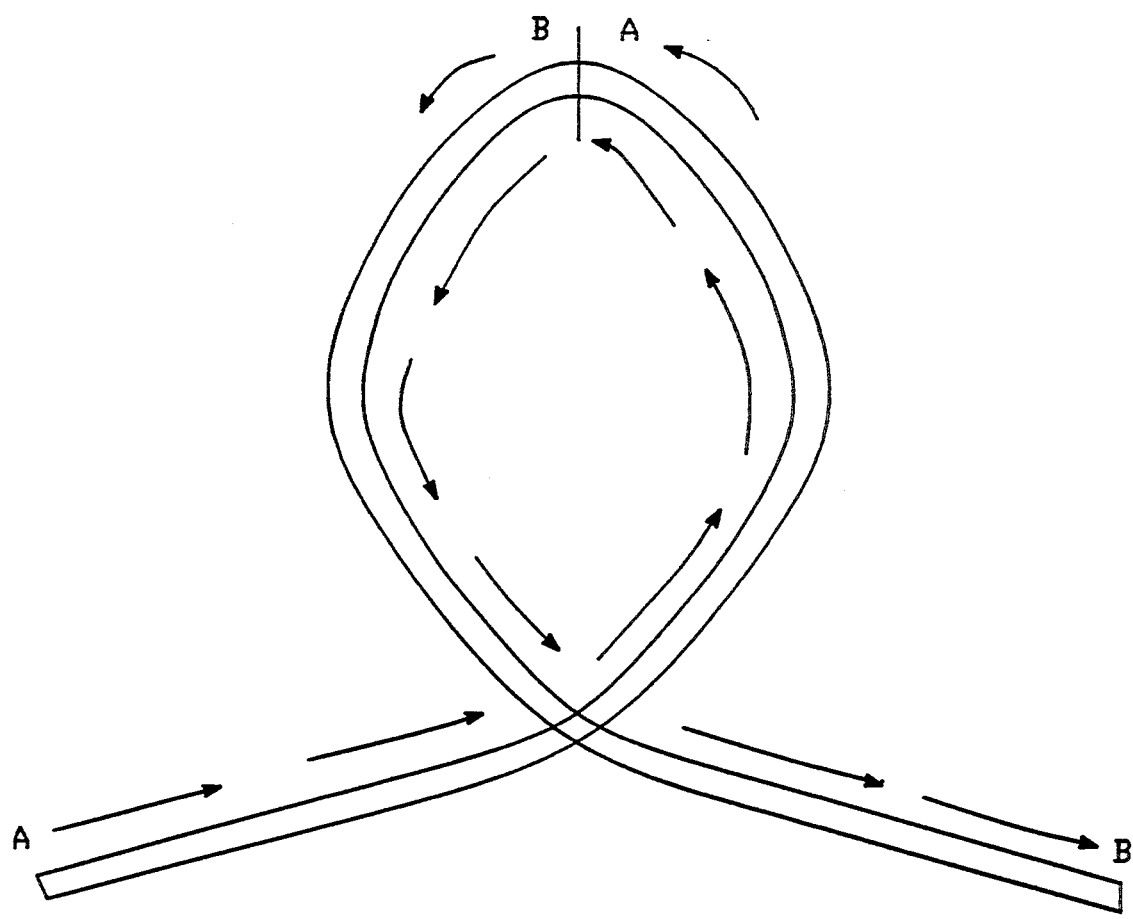
FIG.—20A

| G10 | G11 | G12 |
|-----|-----|-----|
| G8  |     | G9  |
| G5  | G6  | G7  |

FIG.—20C

Table
Graphics to Collision Block Cross-Reference

| | A | B |
|---|---|---|
| Graphics Block | Collision Type | Collision Type |
| G5 | C0 | C0 |
| G6 | C1 | C8 |
| G7 | C9 | C9 |
| G8 | C7 | C7 |
| G9 | C2 | C2 |
| G10 | C6 | C6 |
| G11 | C4 | C4 |
| G12 | C3 | C3 |

FIG.-22

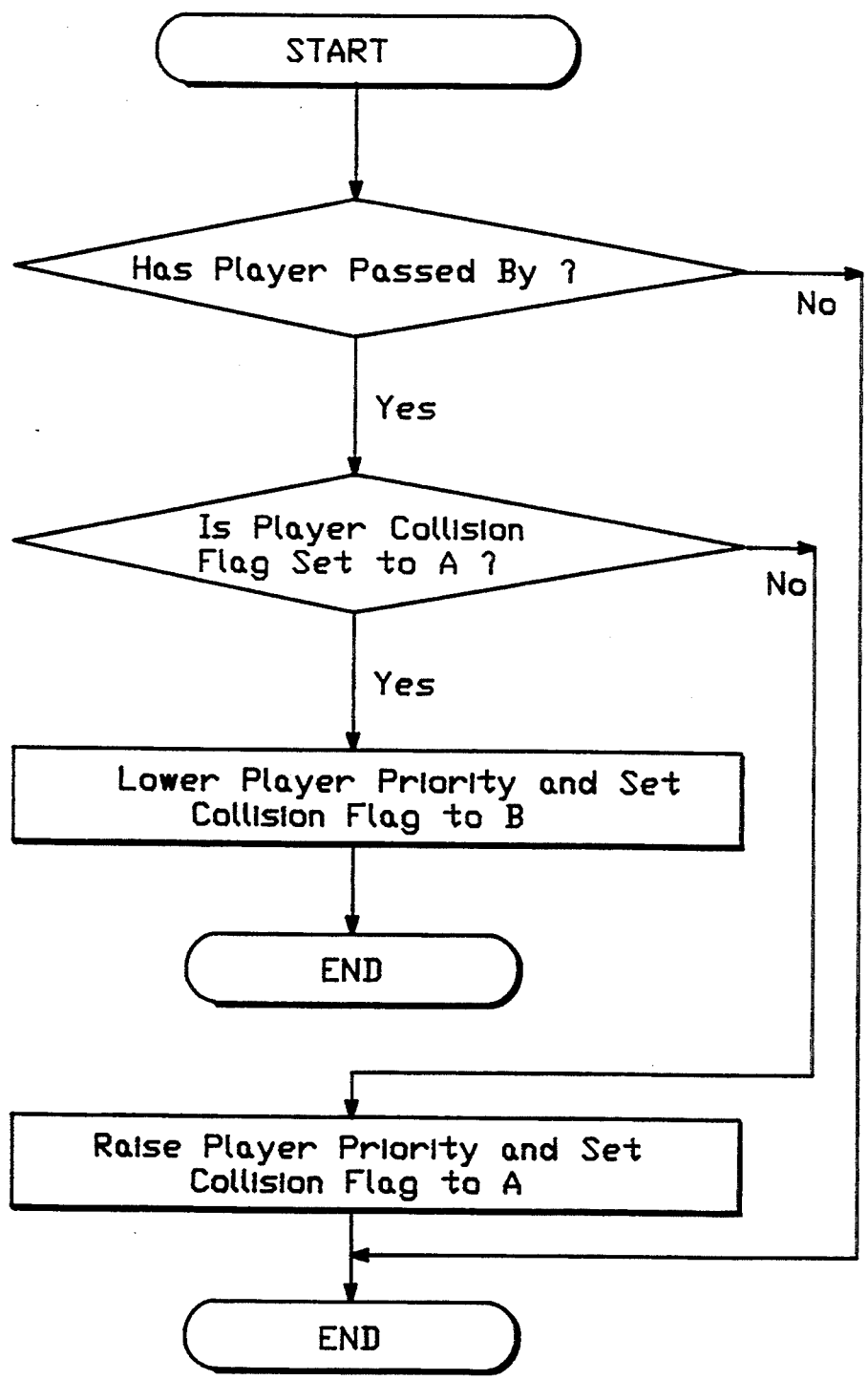
FIG.—24

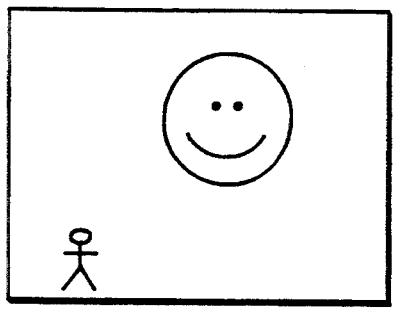
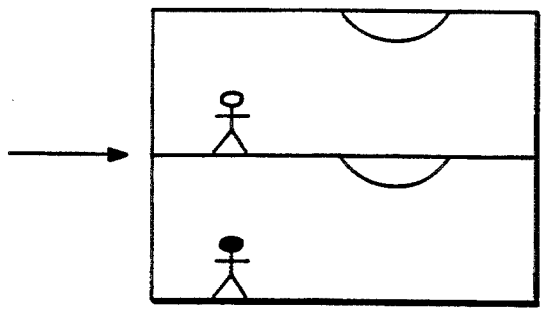
FIG.–25A
(PRIOR ART)
FIG.–25B
(PRIOR ART)
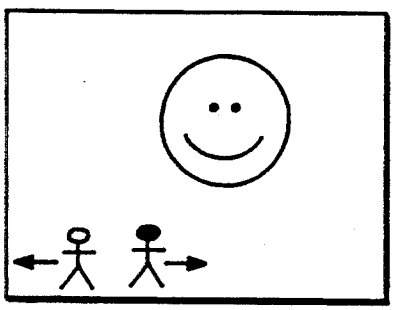
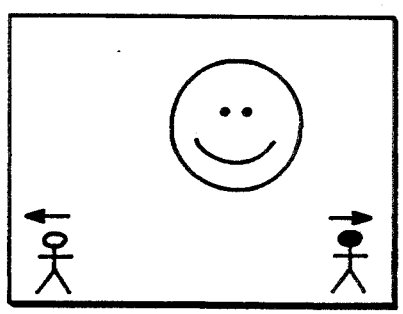
FIG.–26A
(PRIOR ART)
FIG.–26B
(PRIOR ART)
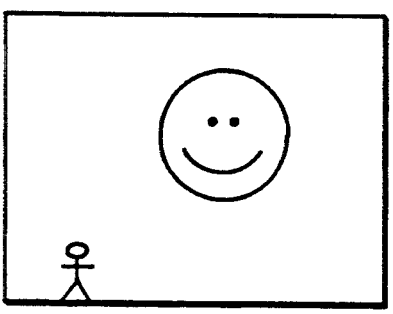
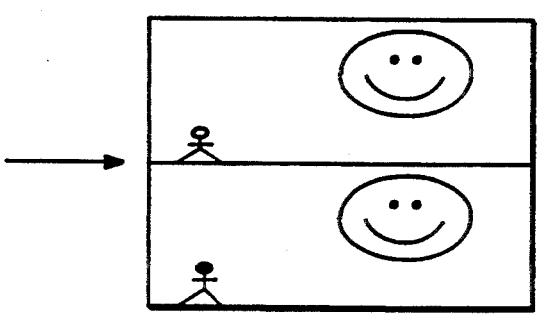
FIG.–27A
FIG.–27B even frame odd frame Interlaced frame

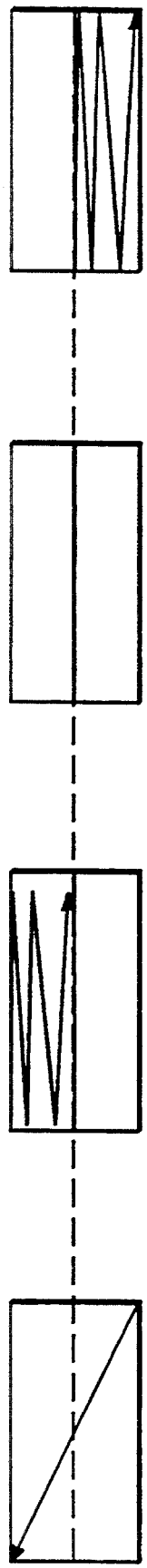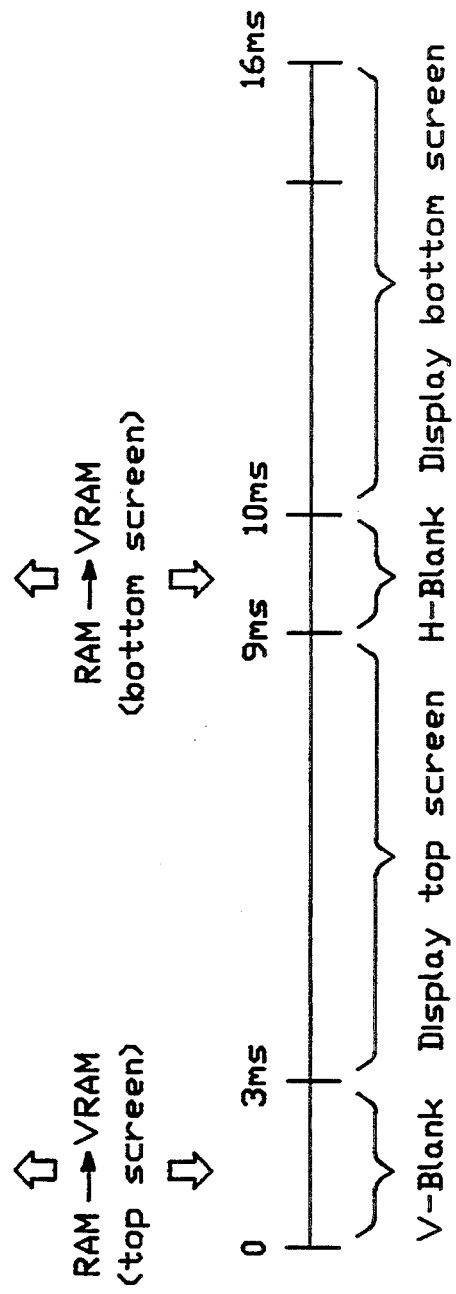
FIG.–31A  FIG.–31B  FIG.–31C  FIG.–31D
FIG.–32

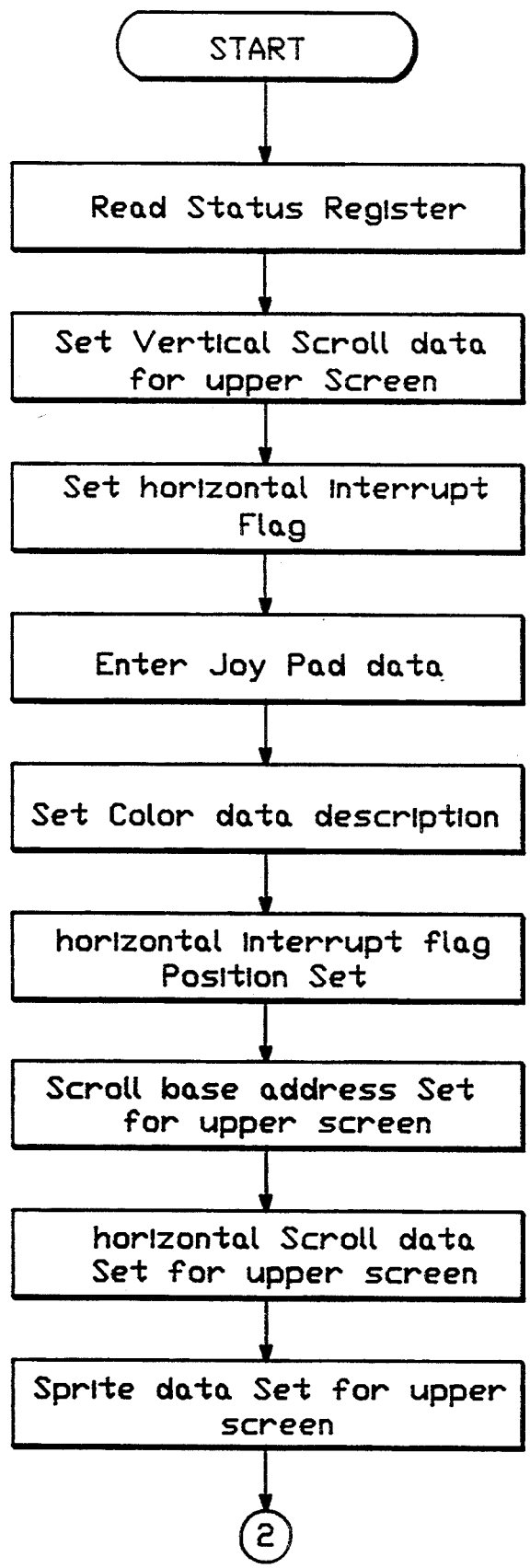
FIG.−33A

|    | 0  |    | 1  |    | 2  |    | 3  |    |
|----|----|----|----|----|----|----|----|----|
|    | D7 | D0 | D7 | D0 | D7 | D0 | D7 | D0 |
| 00 | a1 | a2 | a3 | a4 | a5 | a6 | a7 | a8 |
| 04 | b1 | b2 | b3 | b4 | b5 | b6 | b7 | b8 |
| 08 | c1 | c2 | c3 | c4 | c5 | c6 | c7 | c8 |
| 0C | d1 | d2 | d3 | d4 | d5 | d6 | d7 | d8 |
| 10 | e1 | e2 | e3 | e4 | e5 | e6 | e7 | e8 |
| 14 | f1 | f2 | f3 | f4 | f5 | f6 | f7 | f8 |
| 18 | g1 | g2 | g3 | g4 | g5 | g6 | g7 | g8 |
| 1C | h1 | h2 | h3 | h4 | h5 | h6 | h7 | h8 |
| 20 | i1 | i2 | i3 | i4 | i5 | i6 | i7 | i8 |
| 24 | j1 | j2 | j3 | j4 | j5 | j6 | j7 | j8 |
| 28 | k1 | k2 | k3 | k4 | k5 | k6 | k7 | k8 |
| 2C | l1 | l2 | l3 | l4 | l5 | l6 | l7 | l8 |
| 30 | m1 | m2 | m3 | m4 | m5 | m6 | m7 | m8 |
| 34 | n1 | n2 | n3 | n4 | n5 | n6 | n7 | n8 |
| 38 | o1 | o2 | o3 | o4 | o5 | o6 | o7 | o8 |
| 3C | p1 | p2 | p3 | p4 | p5 | p6 | p7 | p8 |

FIG.—36

In Interlace Mode 2, one cell consists of 8 x 16 dots and therefore 64 bytes (16 long words) are required.

FIG.—35

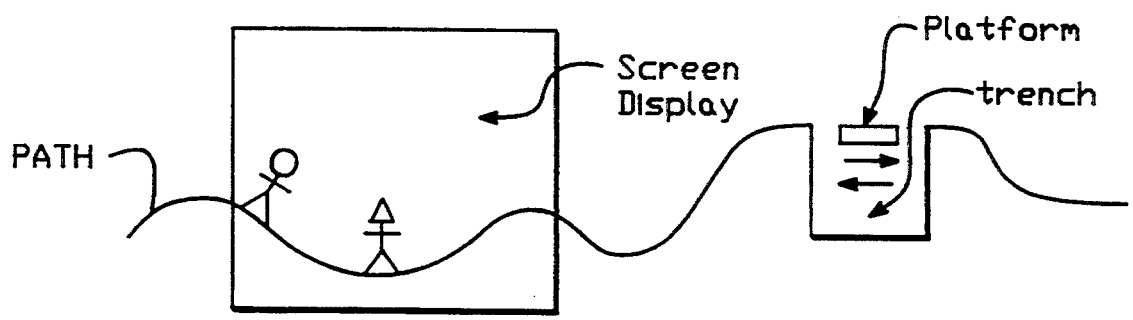
FIG.−37A
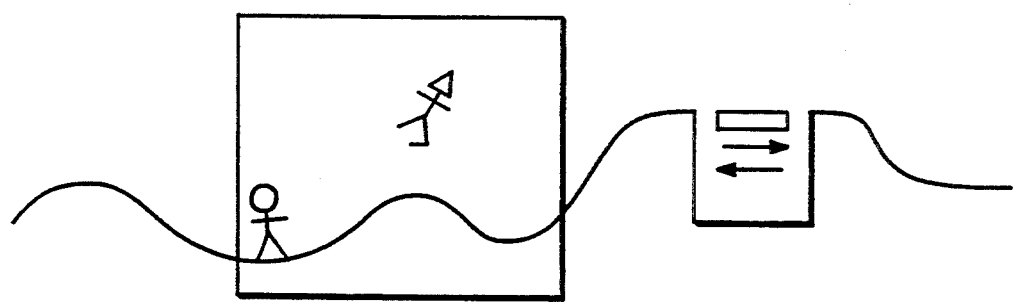
FIG.−37B

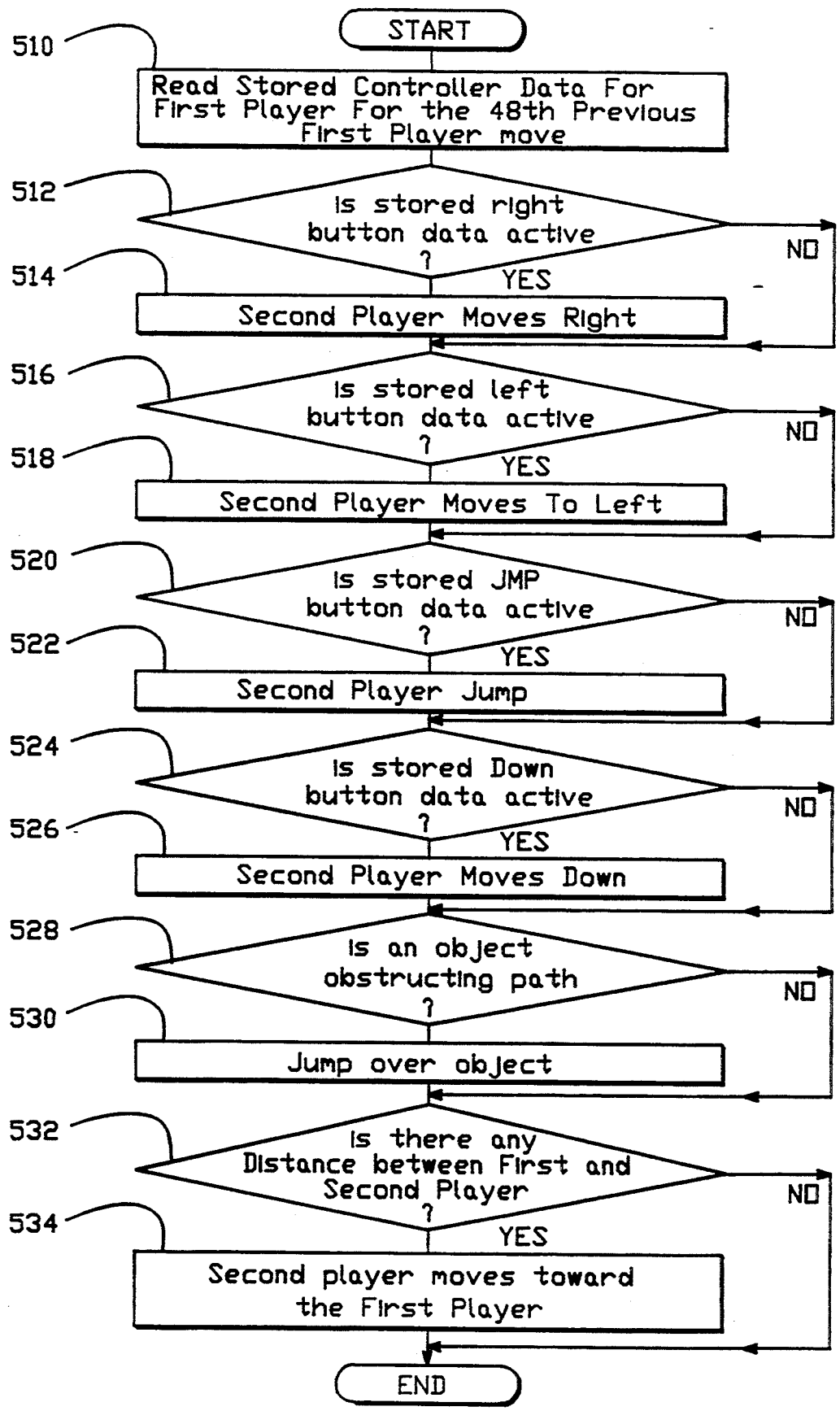
FIG.—38

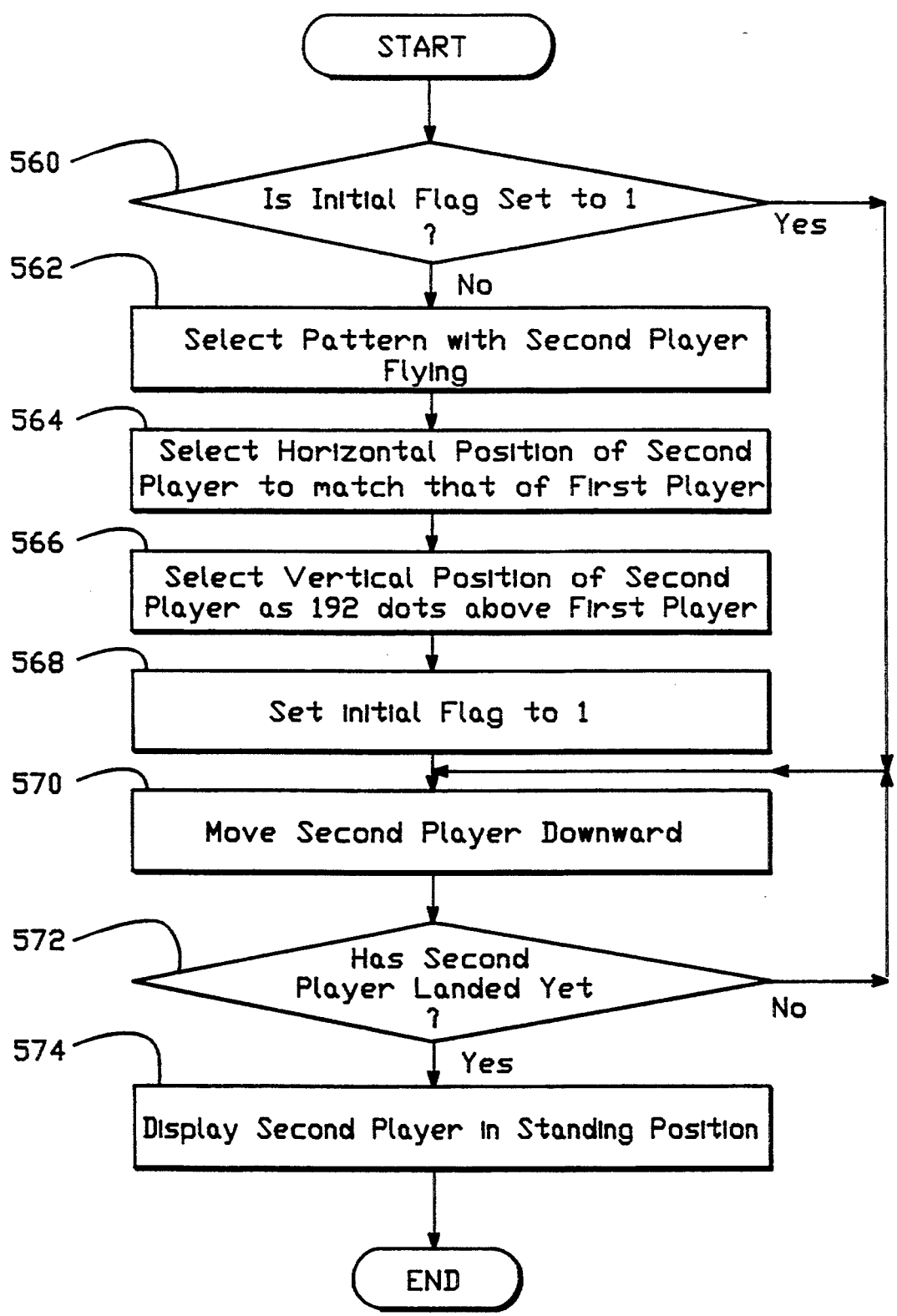
FIG.−40

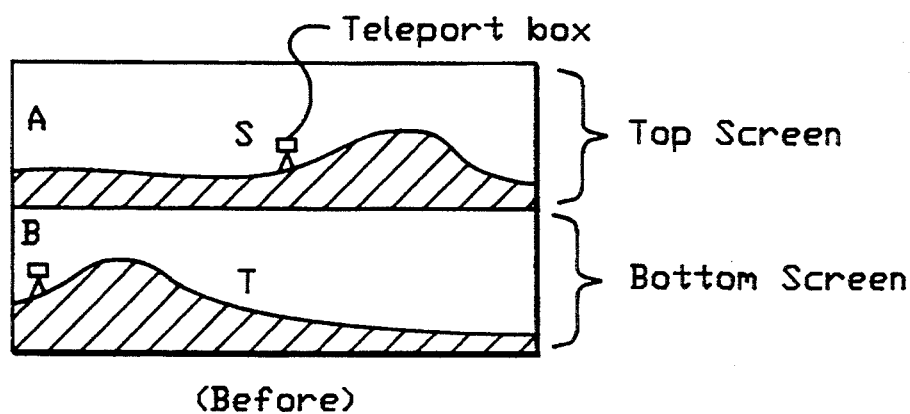
FIG.—41
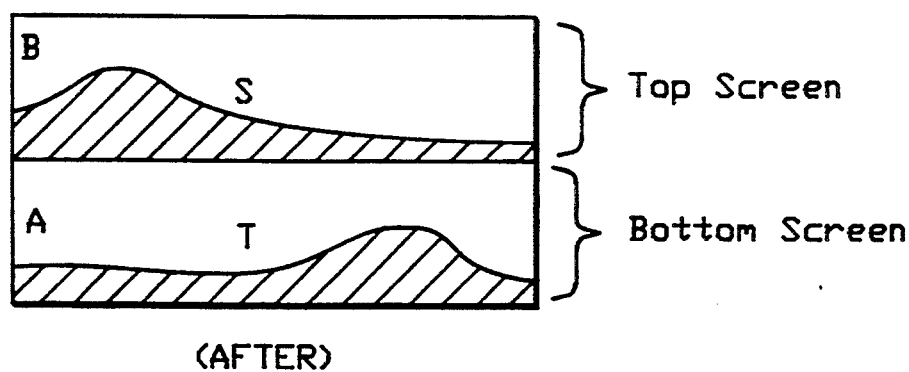
FIG.—42

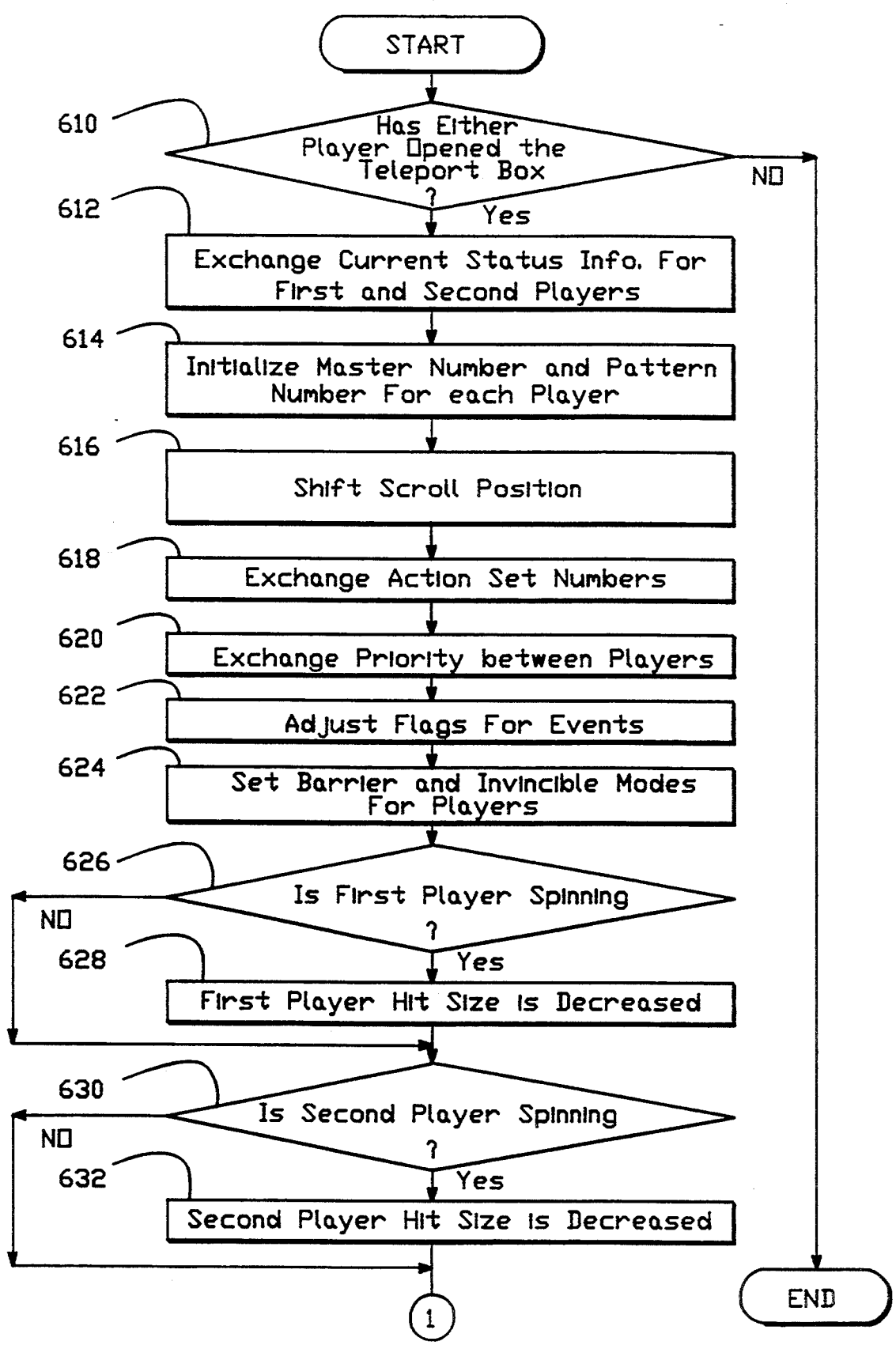
FIG.—43A

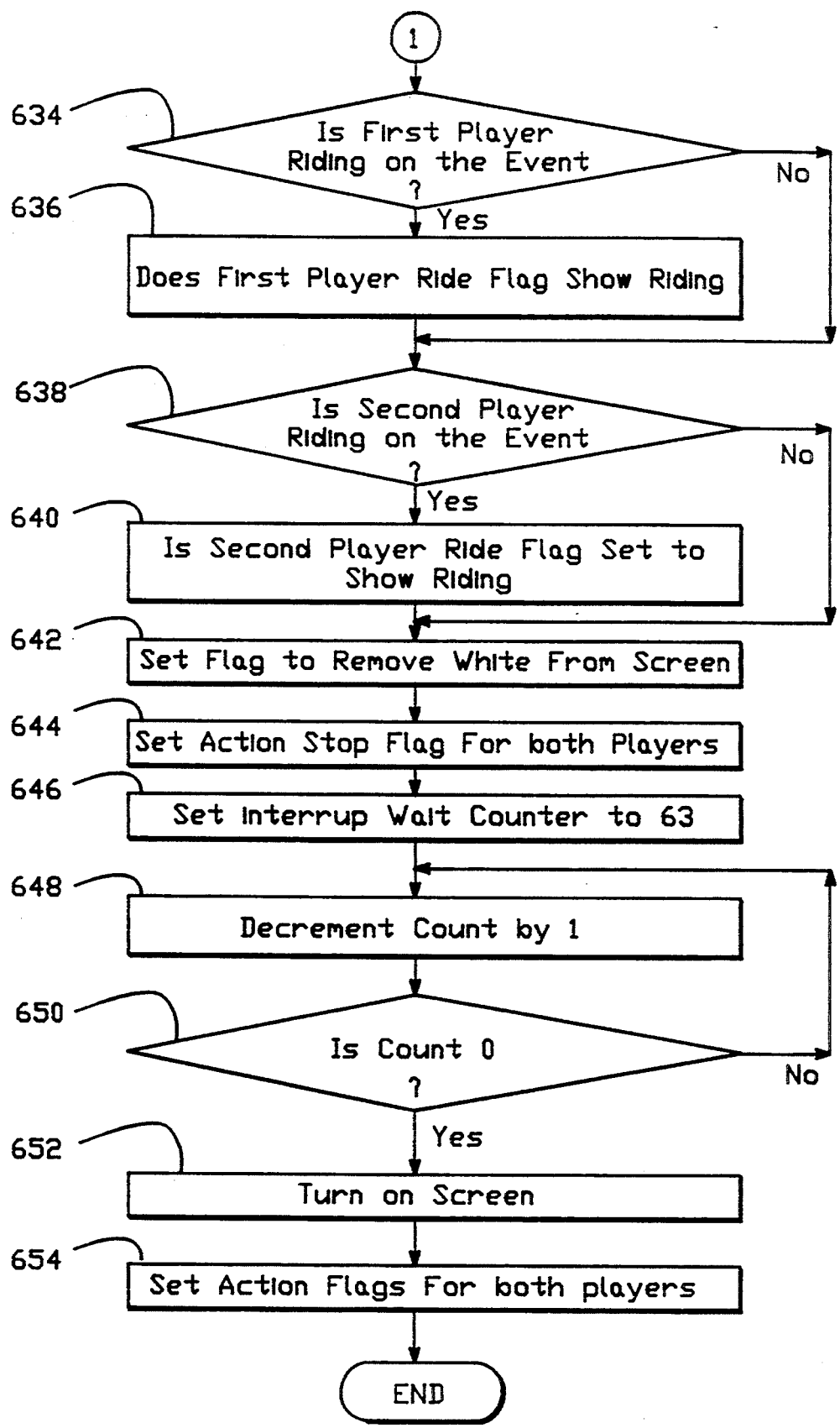
FIG.—43B

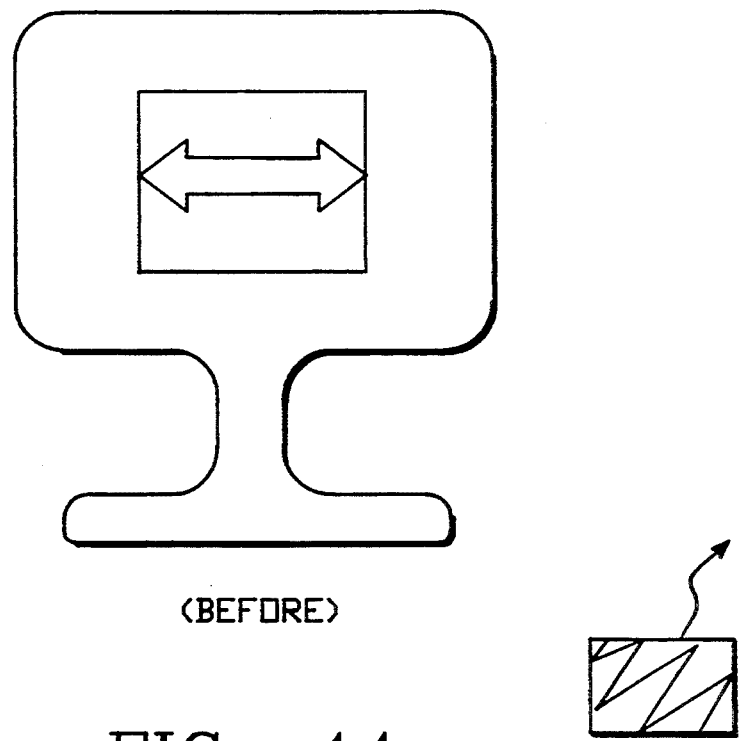
FIG.—44
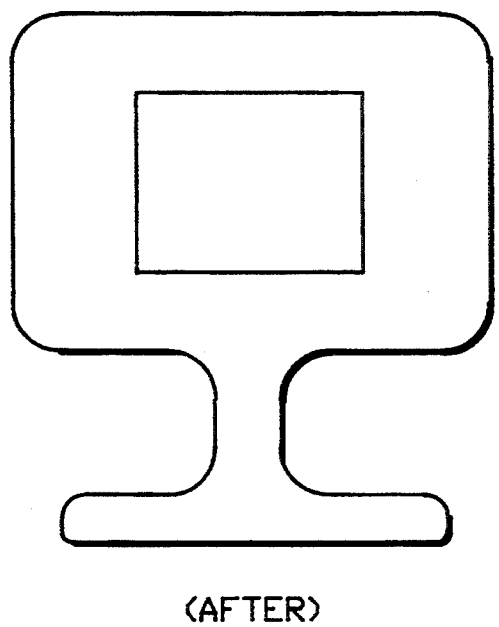
FIG.—45

VIDEO GAME WITH SPIRAL LOOP GRAPHICS

This application is a continuation-in-part of application Ser. No. 07/979,570, filed Nov. 20, 1992, now abandoned.

BACKGROUND OF THE INVENTION

1. Field of the Invention

The invention relates generally to video games, and more specifically, to video games that employ a playfield that scrolls relative to a game character in order to show character motion through the playfield.

2. Description of the Related Art

Video games are well known in which a game character, or sprite, follows a prescribed path through a scrolled playfield in response to the commands of a user who is playing the game. The user operates an input device which includes a control console which may include a "joy stick" used to control character movement. A user command issued through the input device for the character to move right results in the playfield scrolling to the left which creates the impression that the character is moving to the right relative to the playfield. Conversely, a user command for the character to move left results in the playfield scrolling to the right which creates the impression that the character is moving to the left. During such scrolling the character image ordinarily remains fixed near the center of the screen display despite the appearance of movement relative to the playfield.

In typical video games, the input device permits the user to command the character to perform numerous activities such as to jump or to crouch down or to speed-up or to slow-down. Often, a game character takes on different appearances as it engages in different activities. For example, when the character moves at slower speeds, its legs, arms and torso may be fully visible as the playfield scrolls slowly. However, when the character speeds up, most of the character image may be portrayed as a blur with only the character head being fully recognizable while the playfield scrolls rapidly. Moreover, the character may have one portrayal when it crouches and another portrayal when it jumps. Additionally, there may be special character antics that involve a series of images, such as tumbling, throwing a kick or "flying" through the air.

A challenge associated with implementing such video games is to produce a playfield which has a variety of images and obstacles. For example, there may be mountains to climb, canyons to jump over or enemies to defeat. In the midst of all of this activity, changes in the appearance and movements of the character and the playfield must occur smoothly and quickly so as not to distract the user or detract from the excitement of a high speed action packed video game.

Consequently, certain uniform techniques often are employed to control the movement and appearance of game characters and the playfield. These techniques include defining a path to be followed by the character through the playfield. The character moves along the path in response to user commands. For example, if the path ascends to the right, and the user commands the character to move to the right, then the character is depicted climbing the path to the right as the playfield scrolls to the left. If the user subsequently commands the character to move back towards the left, then the character will be shown descending the path to the left as the playfield scrolls to the right.

The image of the character moving along the path is produced under the control of a computer program. Character movement is constrained by the program such that as the character moves left or right, it always tries to maintain contact with the path. If the character jumps, for example, it soon returns (falls) to the path. If the path includes a discontinuity such as an on-screen image of a cliff, for example, then a character running off the edge of the cliff might fall to another path at the base of the cliff; or it might jump across the chasm at the edge of the cliff and land on a path opposite the cliff. The user controls character movement, but the program ensures that the character generally follows the path.

While paths through the playfield generally have been an acceptable way to constrain character movement, there have been shortcomings with there use. For example, a typical earlier method for making sure that a character follows the path is to use collision blocks. As the character moves in response to user commands, a computer program references stored collision blocks to determine the exact path to be followed in response to such commands. Specifically, the playfield is divided into graphics blocks. As the character traverses individual graphics path blocks, a path control program references individual collision blocks that correspond to such graphics path blocks. A collision block is used to determine, for example, whether the path within a graphics path blocks is level, inclined or drops off a cliff.

A problem associated with such prior methods is that it may be desirable for the character to proceed along a path that corkscrews or turns upside down or banks (or is inclined) sideways. Since a typical earlier path program operates by keeping a character firmly planted on a path as if due to the force of gravity, the character ordinarily would fall off such a banked or upside down path.

Thus, there has been a need for improved graphics techniques which display banked, upside down or sideways path segments. The present invention meets this need.

SUMMARY OF THE INVENTION

In one aspect, the invention involves a method for controlling the appearance of a video game character as the character traverses a path displayed on a display screen. The method is especially beneficial in a video game system which includes a graphics controller, digital memory and a display screen. A banked path segment is displayed on the screen. A video game character is displayed upright in at least one location on the banked path and is displayed upside down in at least one other location on the banked path. Multiple sprite patterns are stored in the digital memory. The different patterns are representative of the appearance of the character at different locations on the banked path as the character traverses the banked path. The character's location on the banked path is tracked as the character traverses it. Different sprite patterns are used to depict the character at different locations on the banked path as the character traverses the path.

Thus, for example, the character can follow a path which banks at a severe angle, twists sideways or even turns upside down. The character does not fall off the path when it twists and turns, and the character image changes as the character moves along the path. For example, if the path turns upside down, then the character is shown upside down. If the path banks sideways then the top of the character's head might be shown as the character moves along a path that is parallel to the screen.

These and other purposes and advantages of the present invention will become more apparent to those skilled in the art from the following detailed description in conjunction with the appended drawings in which:

BRIEF DESCRIPTION OF THE DRAWINGS

FIG. 4 is an 8-dot×8-dot graphics cell within the screen of FIG. 3;

FIG. 5A represents a color pattern used to illuminate the graphics cell of FIG. 4;

FIG. 5B represents an 8 bit byte of color information used to illuminate two dots of the color pattern of FIG. 5A;

FIG. 6 represents the use of a pattern number table to correlate the graphics cells of FIG. 4 with the color patterns of FIG. 5A;

FIG. 7 is a block diagram of a graphics controller in accordance with the present invention;

FIG. 10 is a representative sprite table that can be stored in the control RAM of the controller of FIG. 7;

FIG. 11 shows a representative sprite attribute table stored in the VRAM of the controller of FIG. 7;

FIG. 12 is a table showing the priority encoding rules implemented by the priority encoder of the TV interface circuit of the controller of FIG. 7;

FIG. 13 is a series of color patterns illustrating the role of the vf and hf bits of the pattern number of FIG. 8;

FIG. 15 shows a series of pattern generator data formats in which different patterns can be stored to generate sprites of different horizontal and vertical sizes;

FIGS. 16A-D show a shuttle loop in accordance with the invention; 16A shows character orientation; 16B shows character offset; 16C shows character trajectories in the event that the character jumps; and 16D shows offset measurements relative to the center of the loop;

FIG. 17 shows a collection of character image patterns displayed on screen as the character traverses the loop of FIGS. 16A-D;

FIGS. 18A-B show a flow diagram of a computer program used to control the display of character movement on the loop of FIGS. 16A-D;

FIGS. 19A-B show a table of angles and an offset table used to select character patterns and to determine character offset as the character traverses the loop of FIGS. 16A-D;

FIGS. 20A-C show an illustrative overlap loop path and the graphics path blocks that comprise the path in accordance with the invention;

FIG. 22 is a table which cross-references graphics blocks to collision blocks;

FIG. 24 is a flow diagram of a process used to change the collision type of a game character when the character passes a prescribed region of the playfield;

FIGS. 25A-B show possible earlier single screen graphics including playfield graphics and character graphics and possible earlier split screen graphics in which some of the playfield graphics have been lost in the split screen image;

FIGS. 26A-B show consecutive views of another possible earlier single screen graphics display in which two characters in the same screen are moving away from each other as indicated by the arrows;

FIGS. 27A-B show single screen graphics and split screen graphics in accordance with the present invention;

FIGS. 31A-D illustrate four stages in the rendering of a split screen image in accordance with the present invention;

FIG. 32 shows a timing diagram corresponding to the four stages in FIGS. 31A-D;

FIGS. 33A-B is a flow diagram representing a computer program which explains the data transfer during rendering of a split screen display in an interlace mode;

FIG. 35 shows a single cell which can be used to produce a graphics pattern for use in interlace mode;

FIG. 36 shows another representation of a single cell which can be used to produce a graphics pattern in the interlace mode;

FIGS. 37A-E illustrate the operation of the cooperative mode by showing a series of screen displays which might appear as first and second players traverse a prescribed path through a playfield;

FIG. 38 is a flow diagram which illustrates the operation of a computer program used to control the movement of the second game character in the cooperative mode;

FIG. 40 is a flow diagram of a computer program used to move the second character back into view after it has fallen far behind the first character and has disappeared from view on the display screen;

FIG. 41 shows a split screen display in accordance with the present invention in which playfield region A is shown in a top screen and playfield region B is shown in a bottom screen and in which a first player is shown in the top screen and a second player is shown in the bottom screen;

FIG. 42 shows a split screen display in which the playfield regions for the top and bottom screens shown in FIG. 41 have been interchanged;

FIGS. 43A-B show a flow diagram of a computer program used to control the exchange of information as a screen display changes from the screen display shown in FIG. 41 to the screen display shown in FIG. 42;

FIG. 44 shows an exchange object in accordance with the present invention prior to activation; and FIG. 45 shows the exchange object of FIG. 44 after activation.

DETAILED DESCRIPTION OF THE PREFERRED EMBODIMENT

The present invention comprises a novel apparatus and method for use in a video game. The following description is presented to enable any person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown, but is to be accorded the widest scope consistent with the principles and features disclosed herein.

Overview

Figure 1:
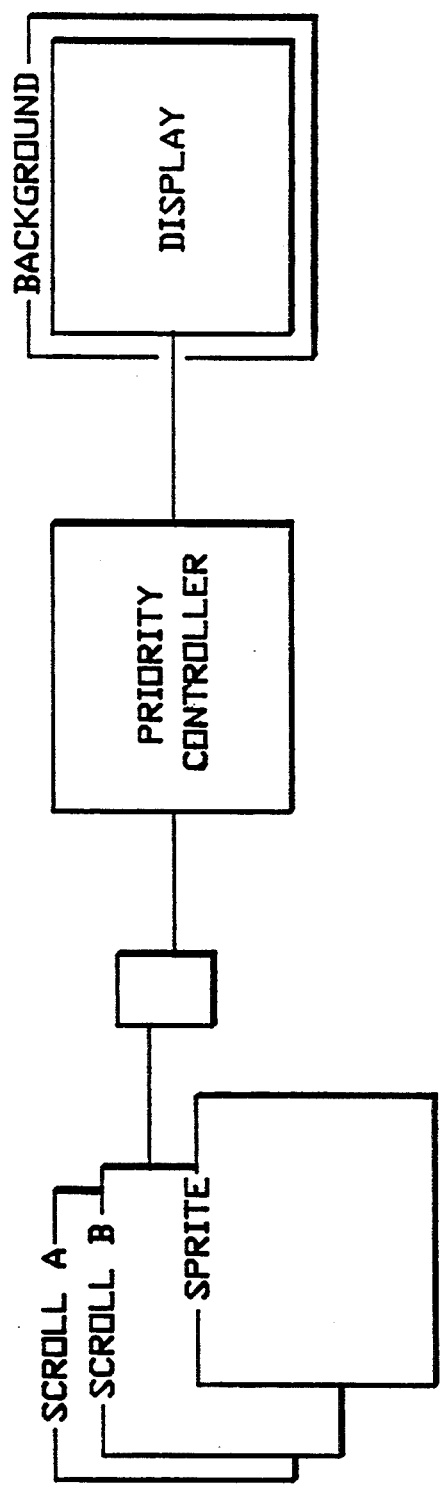
FIG. 1 is a block diagram of a video display and a priority controller and a concept diagram of the scroll planes used to produce video images in accordance with the invention.

In a present embodiment of the invention, a video display generator is used to produce graphical images on a TV display screen. The graphics information used to produce the images can be thought of as a series of planes, one behind the other as shown in the illustrative drawing of FIG. 1. The first plane is the sprite plane. The next two planes are the scroll A plane and the scroll B plane. The actual image produced on the TV screen consists of a series of rows of dots that are individually illuminated in different colors so that together the dots form the image. The graphics information used to determine how each dot is to be illuminated is provided in the three planes. For each dot, a priority controller determines whether the dot is to be illuminated using information from the sprite plane, the scroll A plane or the scroll B plane. The graphics information in the three planes is prioritized, and dots having the highest priority are displayed.

Figure 2:
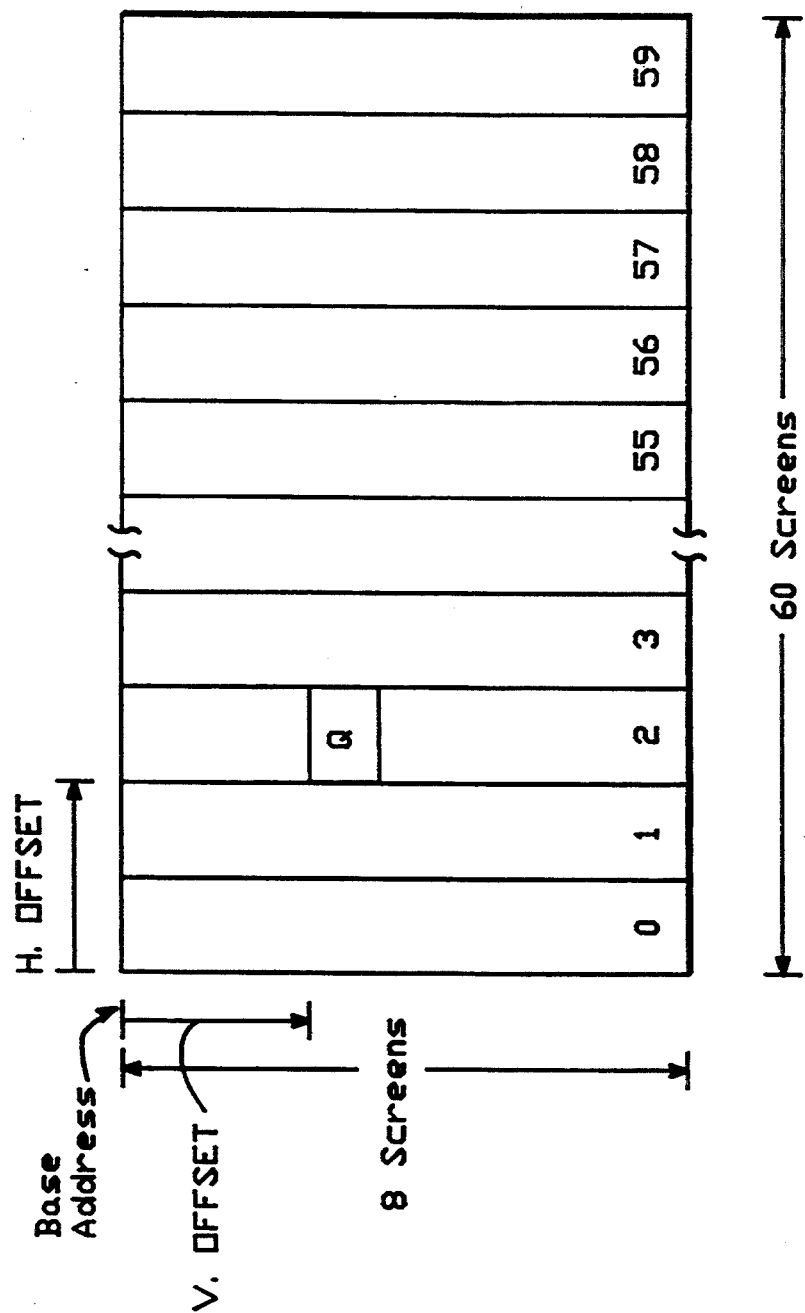
FIG. 2 is a conceptual view of an entire playfield which is sixty screens wide and eight screens high in accordance with the invention.

Scroll A represents a playfield on which a video game is played. Scroll B represents a background for scroll A. The video display can show only a tiny fraction of the entire playfield at any given moment. An entire playfield includes 480 separate screen displays. A video game involves the movement of video game characters through the playfield. The illustrative drawing of FIG. 2 represents a playfield which is 60 screens horizontal and 8 screens vertical. The system of the present invention can operate in either a single screen mode or a split screen mode. In the single screen mode of operation, only a single playfield screen is displayed. That screen corresponds to the portion of the playfield presently traversed by the video game character. In a split-screen mode, two screens are displayed at a time, one for a first video game character and another for a second video game character. For each character, the displayed screen corresponds to the portion of the playfield travelled by that character at that moment.

The playfield image that appears on the display is formed from graphics information stored for scroll A and scroll B. Images called sprites also appear on the screen. Sprites are graphics objects that can move about on the playfield. The game characters are sprites, for example. Graphics information for the sprites is stored in the sprite plane.

Figure 3:
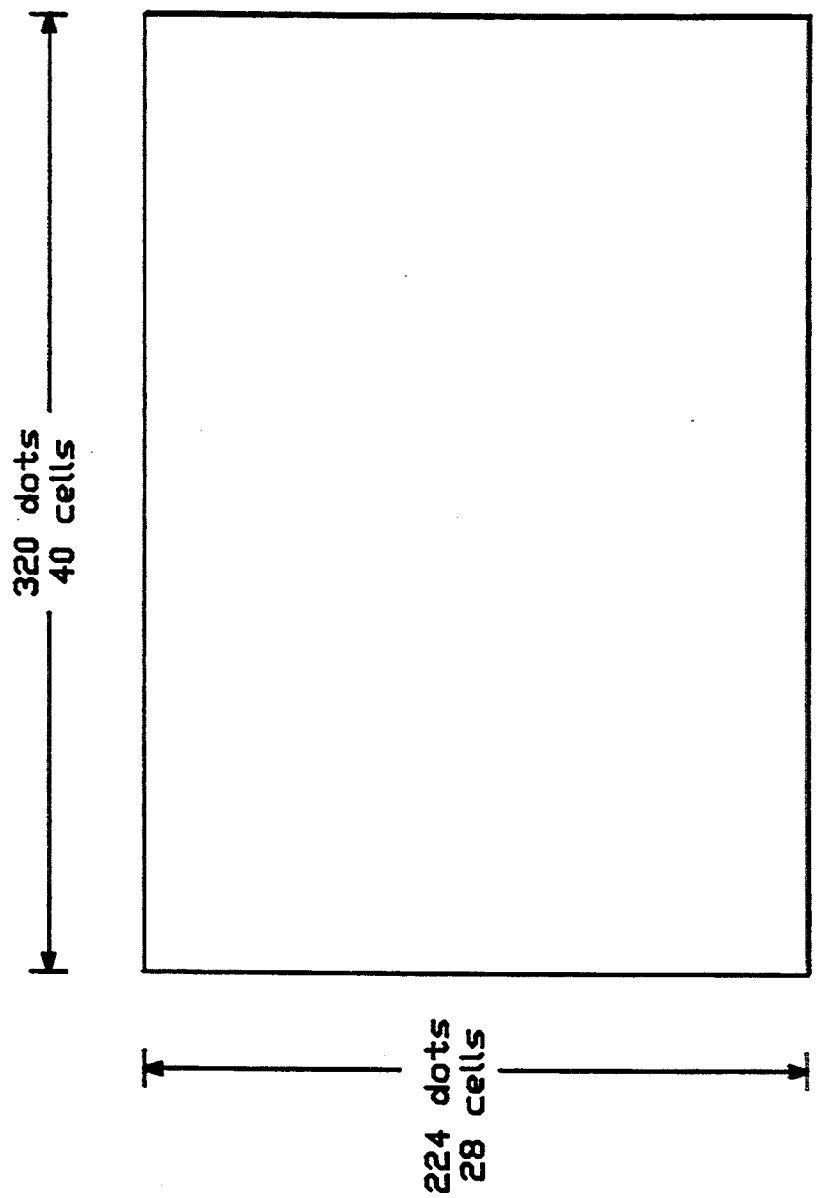
FIG. 3 is a representative (blank) screen within the playfield of FIG. 2.

Each screen, in a non-interlace mode of operation, is 320 dots horizontal and 224 dots vertical. The illustrative drawing of FIG. 3 shows a representative screen. The screen, for example, can be at the screen location indicated by the rectangle Q in the playfield shown in FIG. 2. The rectangle Q is horizontally and vertically offset from the playfield base address at the upper left corner of the playfield.

The entire playfield is divided into graphics blocks. Each graphics block is divided into graphics cells. Each graphics cell is divided into dots which correspond to pixels. Each graphics cell represents an 8 dot×8 dot region of the screen. In the preferred embodiment, there are 40 graphics cells horizontally and 28 graphics cells vertically per screen.

It will be understood that graphics for a typical playfield are initially created by an artist. The graphics then are "digitized". The graphics are divided into graphics cells. The graphics cells are referenced to stored color patterns that contain color information used to color the graphics cells. That way stored color information can be reused for different graphics cells.

For example, a particular region of the scroll A portion of the playfield may represent green grass. Each graphics cell that portrays green grass can use the same stored pattern information. Rather than separately store green grass graphics for each graphics cell portraying green grass in the playfield, a green grass pattern is stored once, and the individual graphics cells are referenced to that stored pattern which can be used to produce grassy screen images.

The illustrative drawing of FIG. 4 shows a representative 8-dot×8-dot graphics cell. For each cell in the displayed image, a determination is made as to whether the dots in the cell are to be illuminated using color pattern information stored for the scroll A plane, the scroll B plane or the sprite plane. As explained above, the same stored pattern information can be used by multiple graphics cells. The function of the graphics controller described below is to make that determination.

Color pattern information is stored for the sprite plane and for the scroll A and scroll B planes. Each pattern dictates the dot color illumination pattern for an entire graphics cell. For example, FIG. 5A represents a pattern in which color information is provided for 64 dots a1-h8. As shown in FIG. 5B, 4 bits of color information are provided per dot. The color information is stored in 32 bytes in which each byte stores 4 bits for one dot and 4 bits for another dot. For each graphics cell in the display screen Q, a determination is made as to whether a color pattern stored in the sprite plane, in the scroll A plane or in the scroll B plane is to be used. The color data of the selected pattern then is used to illuminate the dots of that cell.

The general approach used to locate scroll A and scroll B graphics patterns stored in memory is illustrated in FIG. 6. A table of pattern numbers is maintained for the cells in scroll A, and another table is maintained for the cells in scroll B. For the scroll A table, a pattern number is stored for each cell of the screen. Each pattern number is stored together with a pointer to an entry in a scroll address table which, in turn, points to a subroutine used to access the stored graphics pattern that corresponds to the pattern number. In this manner, a graphics pattern can be located for each graphics cell of scroll A. The graphics patterns used for graphics cells in the scroll B plane are located using a similar approach.

The procedure used to locate color patterns for graphics cells in scroll A and for graphics cells in scroll B is discussed in more detail below, together with a discussion of the steps for locating color patterns for the sprite plane.

Graphics Controller

Referring to the illustrative drawing of FIG. 7, there is shown a block diagram of a graphics controller 40 in accordance with the present invention. The controller 40 includes a RAM 42, a video RAM (VRAM) 45, a Microprocessor 44, a processor interface 45, control logic 46, a control RAM 48, a horizontal counter control 50, a vertical counter control 52. The controller 40 further includes interrupt control 57, direct memory access (DMA) control 59, a line buffer 60, registers 61 and an I/O interface 64. A TV interface circuit 54 provides RGB analog signals to a TV system 56.

The RAM 42 receives graphics information from a cartridge-based ROM 58. A cartridge 63, which forms no part of the present invention, is disclosed in commonly assigned U.S. Pat. application Ser. No. 07/510,070 filed Apr. 17, 1990, invented by Matsubara which is expressly incorporated herein in its entirety by this reference.

First and second external controllers 72, 74 are connected to the controller 40 through the I/O interface 64. The controllers 72, 74 each include buttons to control game character movement. The first controller 72 controls the movement of a first game character (sprite). The second controller 74 controls movement of a second game character (sprite). The S/P button controls start/pause of game play. Buttons A, B, C are used for special game features such as character attacking or character taking on special powers. Buttons labelled with L, R, Up, Dn are used to cause the game character to move left or right or to jump up or to crouch down.

In operation, the video RAM 45 stores graphics patterns like those shown in FIG. 5A for the sprite plane and for the scroll A and scroll B planes. As the TV display screen is scanned line-by-line, patterns corresponding to the graphics information for the scroll A, scroll B and the sprite plane are retrieved, and three independent signals are produced which are representative of the graphics patterns for scroll A, scroll B and the sprites plane. A priority controller in the TV interface 54 selects the appropriate signal on a dot-by-dot basis according to designated priorities. A color decoder and DAC in the TV interface 54 receives the output of the priority controller and generates a corresponding RGB signal for transmission to the TV system 56.

Figure 8:
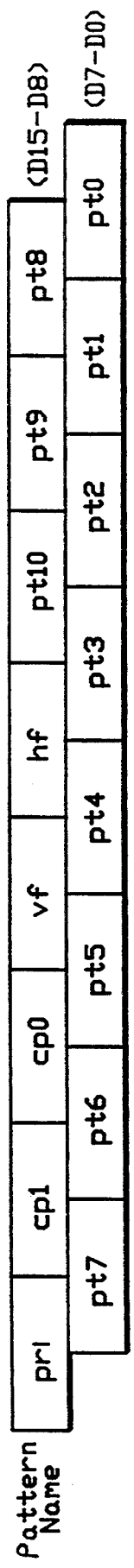
FIG. 8 shows a representative pattern number stored in the pattern number table of FIG. 6.
Figure 9:
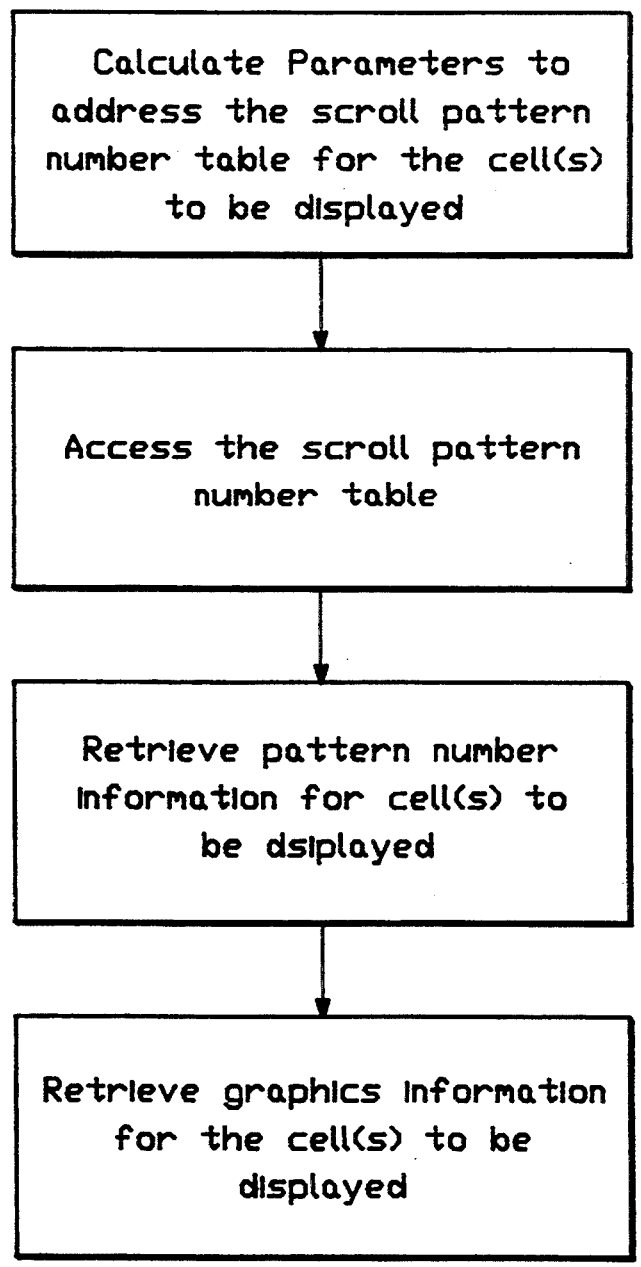
FIG. 9 is a flow diagram of the steps used to access color pattern information using the color pattern number table of FIG. 6.

More specifically, the control logic 46 receives a horizontal scroll value and a vertical scroll value which determines which graphics cell in the playfield is to be rendered. A pattern number table address in the VRAM 45 is calculated based upon the received vertical and horizontal values. The calculated address contains the number that identifies the pattern used to color the graphic cell. A representative pattern number stored in the pattern number table is shown in FIG. 8. The retrieved pattern number is used to access a color pattern stored in the VRAM 45. The color pattern together with color palette selection information retrieved from the pattern number table is used to calculate a color RAM address. The diagram of FIG. 9 further explains the process of retrieving scroll pattern information. The process is similar for scroll A and scroll B patterns.

The following pattern number entry table explains the contents of the bytes of the color pattern number of FIG. 8.

| Pattern Number Table Entry | |
|---|---|
| pri: | Priority |
| cpl: | Color palette selection bit |
| cp0: | Color palette selection bit |
| vf: | V Reverse Bit |
| hf: | H Reverse Bit |
| pt10 ~ pt0: | Pattern Generator Number |

The priority bit refers to priority of the pattern. The two color palette selection bits refer to the selection of the appropriate color palette. In the presently preferred embodiment, there are four color palettes. The vf and hf bits are explained with reference to the drawings of FIG. 13. Essentially, bits vf and hf allow for horizontal and vertical reversal on a cell unit basis. That is, depending on the vf and the hf values, the vertical or horizontal or both vertical and horizontal orientation of a cell can be changed. In this manner, graphics information can be stored more compactly. Different graphics images can be produced using the same stored color patterns simply by changing the orientation of individual color patterns using the vf and hf bits.

The controller 40 processes sprite graphics as follows. Upon receipt of a vertical counter signal from the vertical counter 52 a search is made of the control RAM 48 for a sprite having a vertical position indicated by the vertical counter. The control RAM stores the vertical position, sprite size, a link number and a pattern number. Upon finding one or more sprites having the indicated vertical position in a sprite table shown in FIG. 10. The RAM 48 returns to the control logic 46 the size and link numbers for all such sprites sharing that vertical position. The video RAM 45 contains a sprite attribute table which also is searched for sprites having the vertical address of interest. The drawings of FIG. 11 show the format of an entry in the sprite attribute table. The pattern number and horizontal position of each sprite having such a vertical address are returned from the VRAM 45 to the control logic 46.

Priority among the sprites is determined in accordance with a sprite link table explained below. Based upon the outcome of the individual sprite priorities, the pattern numbers of the sprites to be displayed for the particular vertical line is determined. Horizontal count information is provided by the horizontal counter 50. If there are multiple sprites on a line then a calculation of sprite priority determines which sprites are to appear in view and which are to be hidden from view. The pattern number is used to address the appropriate sprite color patterns stored in VRAM 45. Dot-by-dot illumination information for the vertical line is transferred to the line buffer 60.

The role of the Priority Controller in the TV interface circuit 54 will be better understood by reference to the table of FIG. 12. For each graphics cell visible within the display screen, a priority is set for the sprite plane, the scroll A plane and the scroll B plane. The graphics cell with the highest priority is displayed in accordance with the table. Once priority has been determined, an RGB analog signal is produced for either the sprite, scroll A or scroll B signal, depending upon which has highest priority. Thus, for example, if scroll A has the highest priority for a given graphics cell, then the color information produced by the graphics controller for scroll A for that cell is provided as the RGB analog signal to the TV system 56.

Sprites

A Sprite is defined through a Sprite attribute table entry which is stored in VRAM 45 and a sprite status table stored in RAM 42. The following sprite status table lists representative status information that is stored in the RAM 42 for main character (hero) type sprites as well as for various other sprites such as enemies or moving platforms.

| No. of Bytes | Sprite Status Table Description |
|---|---|
| 1 | Action Number |
| 1 | Action Flags |
| 2 | Offset in VRAM |
| 4 | Address of pattern table |
| 4 | X direction offset within playfield |
| 4 | y direction offset within playfield |
| 2 | ± x direction speed |
| 2 | ± y direction speed |
| 1 | vertical offset (in dots) from center of character to bottom of char. |
| 1 | horizontal offset (in dots) from center of character to bottom of character. |
| 1 | sprite priority |
| 1 | horizontal width in dots |
| 1 | pattern number |
| 1 | pattern counter |
| 2 | pattern change number |
| 1 | pattern timer counter |
| 1 | pattern timer master |
| 1 | collision size |
| 1 | collision counter |
| 1 | Routine number 1 |
| 1 | Routine number 2 |
| 2 | angle of character through loop (not sloop) |
| 1 | ride-on flag |
| 1 | hit flag |
| 2 | A/B type collision setting |

The Action Number is essentially the sprite's name. Each sprite has a unique Action Number. An action flag byte includes 8 bits in which one bit indicates whether the Sprite is facing right or left. Another bit indicates whether the sprite is resting on its head or on its feet. Another bit indicates whether the sprite is facing up or down. Still another bit indicates whether or not the sprite is within the field view of the display screen. Four bits are used to indicate the base address of the pattern data used to produce the sprite.

Another 4 bytes are used to indicate the x direction offset of the sprite within the playfield. Another 4 bytes are used to indicate the y direction offset of the sprite within the playfield. Two bytes indicate the x direction of movement (right or left) and speed of the sprite. Two more bytes indicate the y direction of movement (up or down) and speed of the sprite. Another byte is used to set the vertical offset in dots from the center of the sprite to the bottom of the sprite. Still another byte is used to set the horizontal offset in dots from the center of the sprite to the edges. There is a byte to show sprite priority and a byte to indicate horizontal width of the sprite in dots.

There is one byte which designates a pattern number. There is a one byte pattern counter which tells how long to display each sprite pattern on the screen. A sprite may be illustrated using a sequence of patterns and the duration of each pattern must be set. Two bytes indicate the master pattern number also known as the pattern change number. For example, there may be four patterns each to show a running sprite image sequence. Another four patterns may be used to show a rolling sprite pattern sequence. The pattern change number indicates which set of patterns is to be used. The one byte pattern timer counter is similar to the pattern master, and it contains a count of how long a pattern should be displayed. Another byte serves to keep track of the current count during a count down/up. Another byte includes a hit number which indexes into a hit table which determines the size of a character for purposes of determining whether a hit has occurred. The hit number indicates the size of a collision box for the sprite for the purpose, for example, of determining how big a target a sprite poses for enemies. For example, an enemy sprite may be attacked by a hero sprite (that hurl projectile sprites). Determining whether an enemy has been hit (by a projectile) involves finding the enemy's hit size. A collision count indicates how many collisions or hits are required to "kill" or defeat an enemy sprite.

One byte is used to indicate a subroutine zero. For example, if a sprite is not currently moving, then one subroutine is called to display the sprite. If the sprite is moving, then another subroutine is called to display it. Another byte indicates routine number one. For example, if the sprite is standing and shooting then one subroutine is called. If a sprite is standing and not shooting, then another subroutine is called.

Two bytes are used to change the angular orientation of the characters. They can be used to trace a path on an inclined/declined surface or through a 360° loop. One byte is used to indicate the status of a ride-on flag. There are objects referred to as "events" in the playfield that the sprite can "ride-on". For example, there are moving platforms in the sprite plane, and the sprite is capable of riding on such platforms. If the sprite is resting on this platform, then the ride-on flag is set. A hit flag indicates whether or not a sprite has run into another object (other than a path) such as a wall or an event. Another byte indicates whether the sprite is an A type collision Sprite or a B type collision sprite.

Sprite Data Attribute Table

The illustrative drawing of FIG. 11 shows a representative Sprite attribute table entry stored in VRAM 45. The following table explains the Sprite attribute information.

| Sprite Attribute Table | |
|---|---|
| vp9 ~ vp0: | V position |
| hp8 ~ hp0: | H position |
| hs1, hs0: | Sprite's H Size |
| vs1, vs0: | Sprite's V Size |
| ld6 ~ ld0 | Link Data |
| pri: | Priority Bit |

-continued

| Sprite Attribute Table | |
|---|---|
| cp1, cp0: | Color palette selection bit |
| vf: | V Reverse Bit 1:Reverse |
| hf: | H Reverse Bit 1:Reverse |
| sn10 ~ sn0: | Sprite Pattern Number |

The vertical and horizontal positions of the sprite are relative to the base address of the scroll screens. The sprite horizontal size can be set at either 8, 16, 24 or 32 pixels. Similarly, the Sprite vertical size can be set, at either 8, 16, 24, or 32 pixels. The sprite priority bit can be set, and its use is described above. The color palette can be selected. The vf and hf bits can be used to reverse a sprite orientation in a manner similar to that described for the pattern generator numbers. The sprite pattern number is indicated by eleven bits sn10–sn0. The link data is used to indicate priority among sprites.

Figure 14:
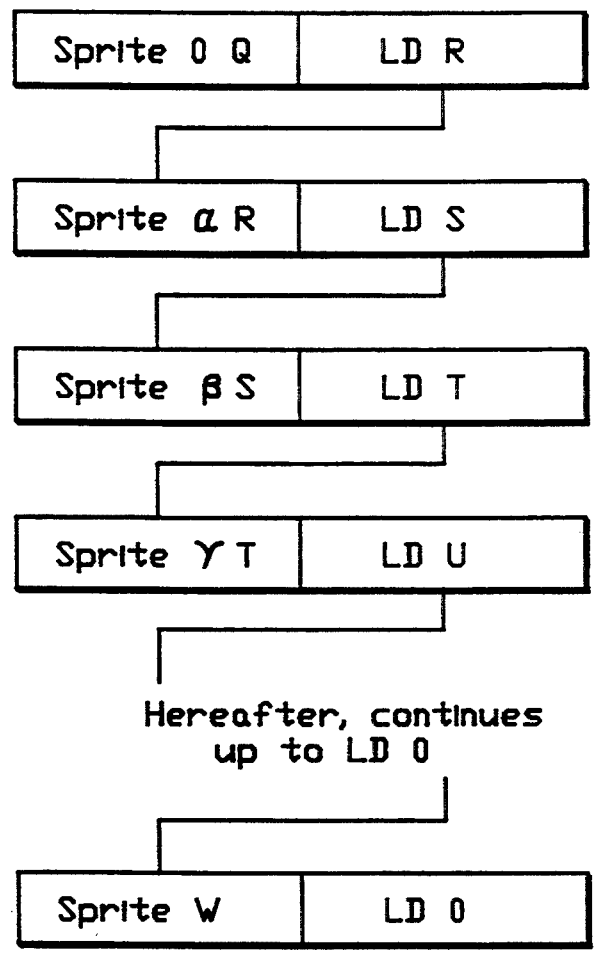
FIG. 14 is a representative link data list for linking sprites by priority for use in the graphics controller of FIG. 7.

Referring to FIG. 14, there is shown a link data list in which Sprites Q–W are linked in accordance with priority. Sprite Q has number 1 priority. Sprite R has number 2 priority. Sprite S has number 3 priority. Sprite W has the lowest priority. In this manner priority is sequentially designated by each sprite's link data and thus it is in a list form. The lowest priority sprite has a link data 0. If there are sprites that are not linked into the list, then they are not displayed on the screen.

Referring to the illustrative drawings of FIG. 15, there is shown a series of pattern generator data in which the different patterns are used to generate sprites of different horizontal and vertical cell sizes. Each cell corresponds to a single pattern which is represented by 32 bytes of information as described above. Thus, for example, the sprite pattern generator data for FIG. 15-N has a total of eight graphics cells. Eight color patterns are used to generate the eight graphics cells. It will be appreciated that computer programs that will be understood by those skilled in the art are stored in the RAM 42 and are used to generate sprite graphics from the sprite pattern generator data.

Shuttle Loop Graphics

Referring to FIG. 16A there is shown a shuttle loop in accordance with the present invention. The shuttle loop is in the form of a spiral loop which is part of the playfield. The spiral loop (sloop) forms a spiral or corkscrew path on which a player rotates through 360 degrees as he runs along it. At points E1 and E2 (entry points) the path surface is normal and the character stands vertically straight up as indicated by the arrows as he moves along the sloop path at these positions. At point M (midpoint) the path is rotated 180 degrees so that a character stands (completely) upside down at this point on the pathway as indicated by the arrow M. At point T1 the path has begun to twist and to bank sideways and the character is visible, but his orientation is oblique as shown by the arrow T1. The banked path simulates the banking of a real life race track in which the road is inclined on banked turns to help racers to stay on the track. When the character reaches the point indicated by arrow T2 it is hidden from view since it is moving on a portion of the sloop path that is banked but hidden from view by the underside U of the sloop path.

The sloop provides a unique graphical image in which a sprite can follow a twisting spiral path on the screen as it moves upward until the path is completely upside down or rotated 180 degrees. The character continues to follow the path temporarily disappearing from view as the path continues its corkscrew rotation through another 180 degrees so that the sprite character emerges again at the other side of the sloop path standing upright. Producing a sloop screen image poses a number of challenges. Not the least of which is selecting the appropriate sprite patterns for each location on the spiral path. As the sprite character travels along the path its feet are maintained on the path.

The character must be shown in a number of different orientations from a side profile view to directly overhead, when the path is banked ninety degrees, and from standing completely upright to standing completely upside down and at various other angular orientations depending upon the banking of the path. FIG. 17 shows twelve different perspective patterns for a character sprite affectionately known as "Tails".

The offset of the sprite character from the spiral loop scroll pattern must be properly maintained since the perspective view of the sprite character changes as the sprite travels along these spiral loops. The line labelled 110 in FIG. 16B approximates the offset from the loop to the center of the sprite character as the sprite follows the sloop path. When the sprite is at either end of the sloop, his feet touch the path, and the sprite center is clearly offset above from the path. However, as the sprite travels along the path, the offset from the center of the sprite character to the sloop changes, and at certain points, the sprite is centered on the sloop path with no offset. For example, at that sloop path location, the path is tilted or banked sideways by ninety degrees, and a top character pattern image is displayed on screen. When the sprite reaches the half-way point, the sprite's feet touch the path, and the sprite center is offset downward from the spiral loop path. As the sprite character continues to follow the path, his gradual downward offset gradually decreases; the sprite momentarily disappears from view; and it then reappears with an offset slightly above the sloop path.

Shuttle Loop Control

As the character closes in on the shuttle loop on the playfield, the program of FIGS. 18A–B begins to execute. The execution of that program is in response to a different program which constantly keeps track of the character's location on the playfield. That other program determines whether the player is closing in on the shuttle loop. If he is, then the program of FIGS. 18A–B begins to execute to determine whether or not the player is actually on the sloop path yet. In essence, the other program has a record of the playfield locations which are considered to be close enough to the shuttle loop to commence execution of the program of FIGS. 18A–B.

In step 100, a determination is made as to whether or not the sprite character ride flag is set to one. The sloop path is considered to be an object or "event" that a sprite can ride on. The character ride flag simply indicates that the player has landed on the sloop path.

In step 102 a determination is made as to whether or not the character is in the process of jumping. The reason for this step is to be certain that the character has not come into close proximity with the beginning of the shuttle loop by jumping from some other location. The shuttle loop is only to be entered by a character moving along a pathway, and not by a character who is jumping.

In step 103 a determination is made as to whether or not the character is in the process of entering the shuttle loop. There are certain zones defined at either end of the shuttle loop indicated by boxes 105 in FIG. 16A. The program of FIGS. 18A-B makes a determination of whether or not the character is moving within either of these entry zones. The program step indicated by 103 keeps track of player movement through either of these two zones 105 to determine whether or not the character is in the process of entering the shuttle loop from either the left or the right.

It will be appreciated that the step 103 determines whether the character is in the process of entering the shuttle loop. As explained below, the character is required to move very quickly as it enters the shuttle loop. Also, once the character has entered the shuttle loop, character movement no longer is controlled using collision blocks, as explained in the next section. Rather, as explained below, it is controlled by reference to an offset table described in this section.

In step 104, if the character ride flag has not been set previously to one and the player is in the process of entering the shuttle loop from either the left or right then the character ride flag is set to one. In step 106 a determination is made as to whether or not the sprite speed is above a pre-set limit. The rules of the video game the present embodiment require that the sprite maintain a certain minimum speed. Otherwise it cannot enter the shuttle loop. This feature adds excitement and realism to the game.

In step 108 a determination is made once again as to whether or not the character is jumping. It should be appreciated that the program of FIGS. 18A-B runs repeatedly as the character traverses the sloop. It is possible that the character could jump while in the process of traversing the shuttle loop. Since the sloop twists like a corkscrew, the result of such a player jump could be that, rather than going upward, the character falls down off the loop. For example, if the character jumps from the left inclined or twisted side of the loop as the sprite runs to the right, the character will end up falling downward rather than jumping upward as indicated by the trajectory shown by arrow 120 in FIG. 16C. In that case, the horizontal speed of the character is maintained, as he falls downward. If, on the other hand, the character jumps while on the inclined portion on the right side of the shuttle loop as it runs to the left, then it will be seen to follow the trajectory 122 as its horizontal speed to the left is maintained and as it falls downward. Its fall will be stopped when it hits the surface 124. In step 111, a determination is again made as to whether or not the character is riding on the shuttle loop. If it is, then in step 112 a determination is made of the character X (horizontal) location on the shuttle loop, and a calculation is made of the character's Y location. In step 114, the character rotation for that X location is calculated. If in steps 106, 108 and 111 it is found that the character's speed is not above the limit or that the character is jumping or that the character is no longer riding on the shuttle loop then a branch to step 116 in FIG. 18B is made. The character ride flag is cleared. In step 118, the number one is assigned to the character's direction counter, and in step 120 the character direction speed is set to a predetermined value.

The direction counter is used to set the number of rotations of the character when it falls off the loop while jumping on either the right or left inclined sections of the loop. The character tumbles as it falls. This tumbling occurs only if the character is on a section of the sloop which is at least a minimum distance above the ground region 124. If the character is not far enough above the ground region 124 when he jumps, then the character simply falls down using its current pattern. The predetermined value set in step 120 tells the rate of tumbling or rotation as the character falls during such a jump.

Figure 16B:
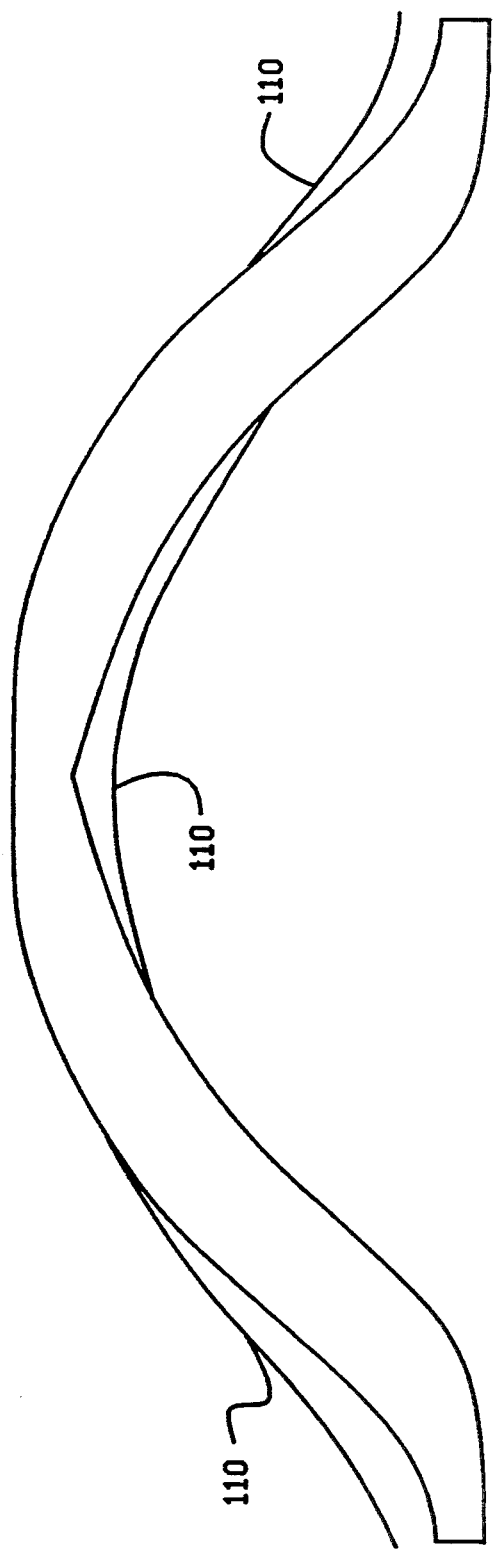
Figure 16C:
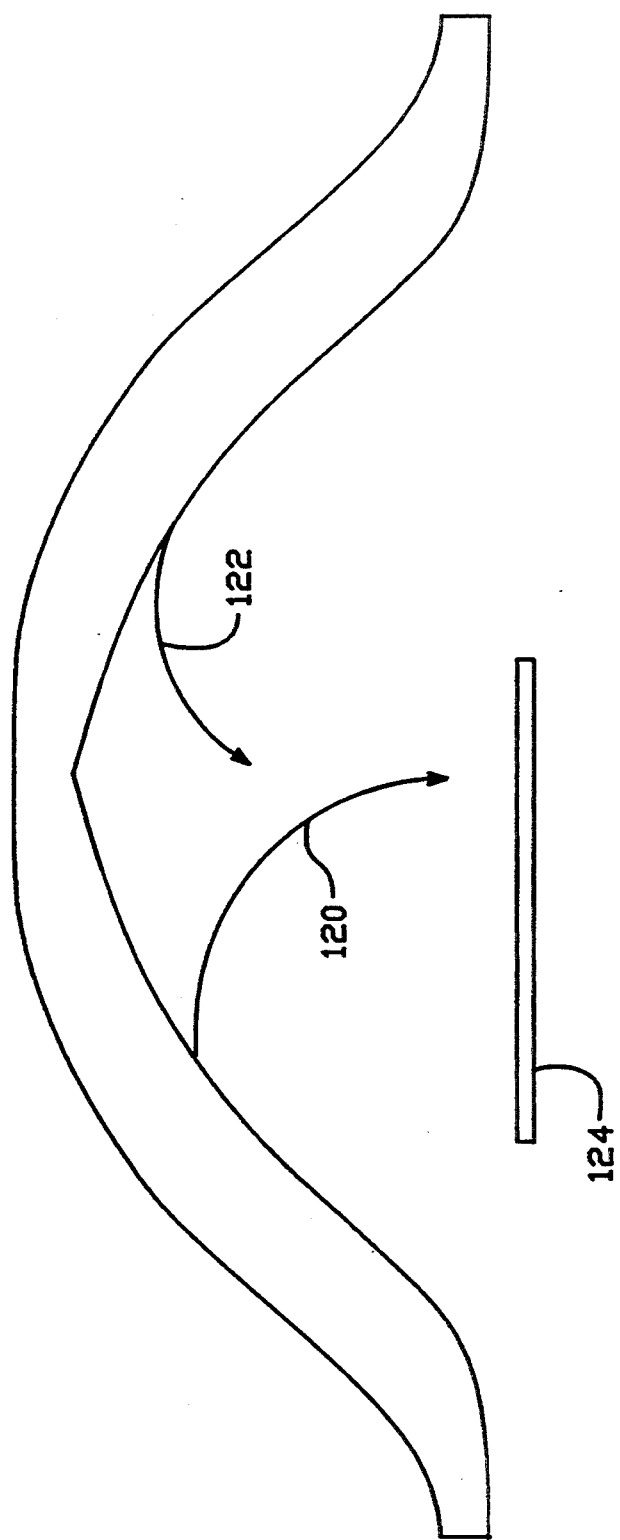
Figure 16D:
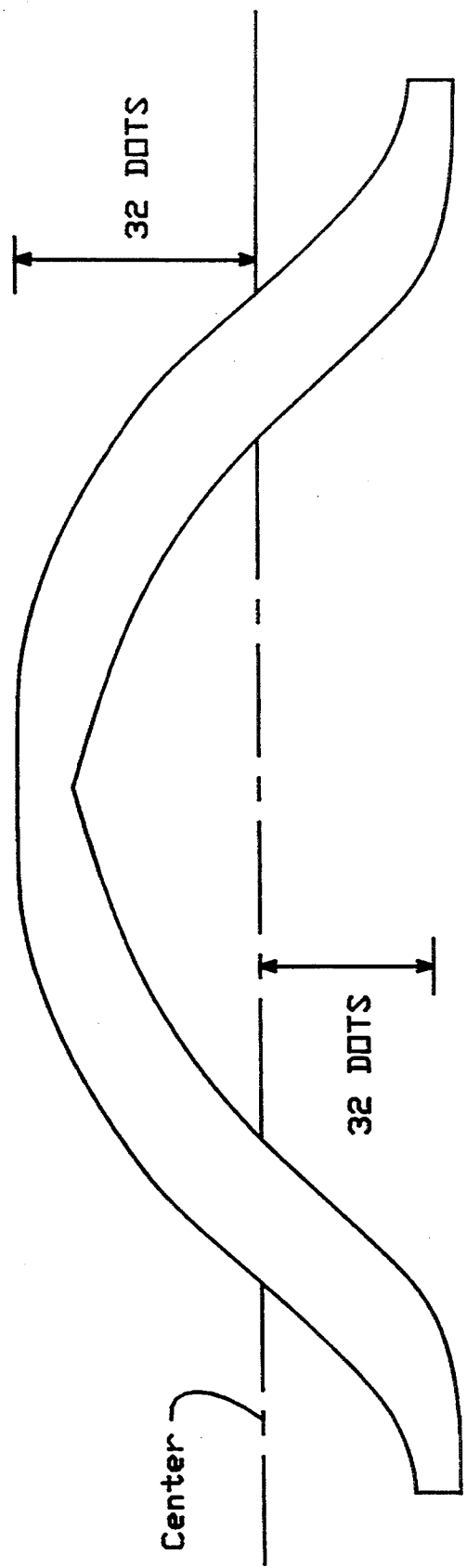

The offset of the center of the loop is calculated from the vertical center of the sloop to a base address in the playfield. The sloop is 64 dots in vertical height. So, the Y offset is 32 dots up or down from that center as indicated by FIG. 16D. The sloop is 384 dots wide. For each X dot increment, a y offset is stored in the offset table of FIGS. 19A-B. The offset value in the table tells the offset to where the center of the sprite should be as shown in FIG. 16B.

The correct sprite pattern is selected from the twelve patterns in FIG. 17. For each row in the offset table, there is one entry in the Table of Angles (orientation table). For example, when the character is at an x offset of one dot, the y offset is 032, and the orientation reference is $00. For example, when the character is at an x offset of 50 dots, the y offset is 030, and the orientation reference is $16. The orientation table entry indicates which of the twelve patterns to select to show proper character perspective for the character's current position on the sloop.

Thus, both sprite offset and sprite viewing perspective are maintained as the sprite travels the sloop.

Switchable A/B Collision Graphics

In a present embodiment of the invention, the character follows a predefined path through the playfield in response to user commands. The path may or may not be visible throughout the playfield, but even if not visible, it is present. The illustrative drawing of FIG. 20A shows a representative path which forms a loop and overlaps itself (an overlap path). Stored information referred to as collision blocks are used to keep the character on the path. The use of collision blocks represents a different approach to keeping a character on a path than the approach described above in relation to the shuttle loop.

Figure 20B:
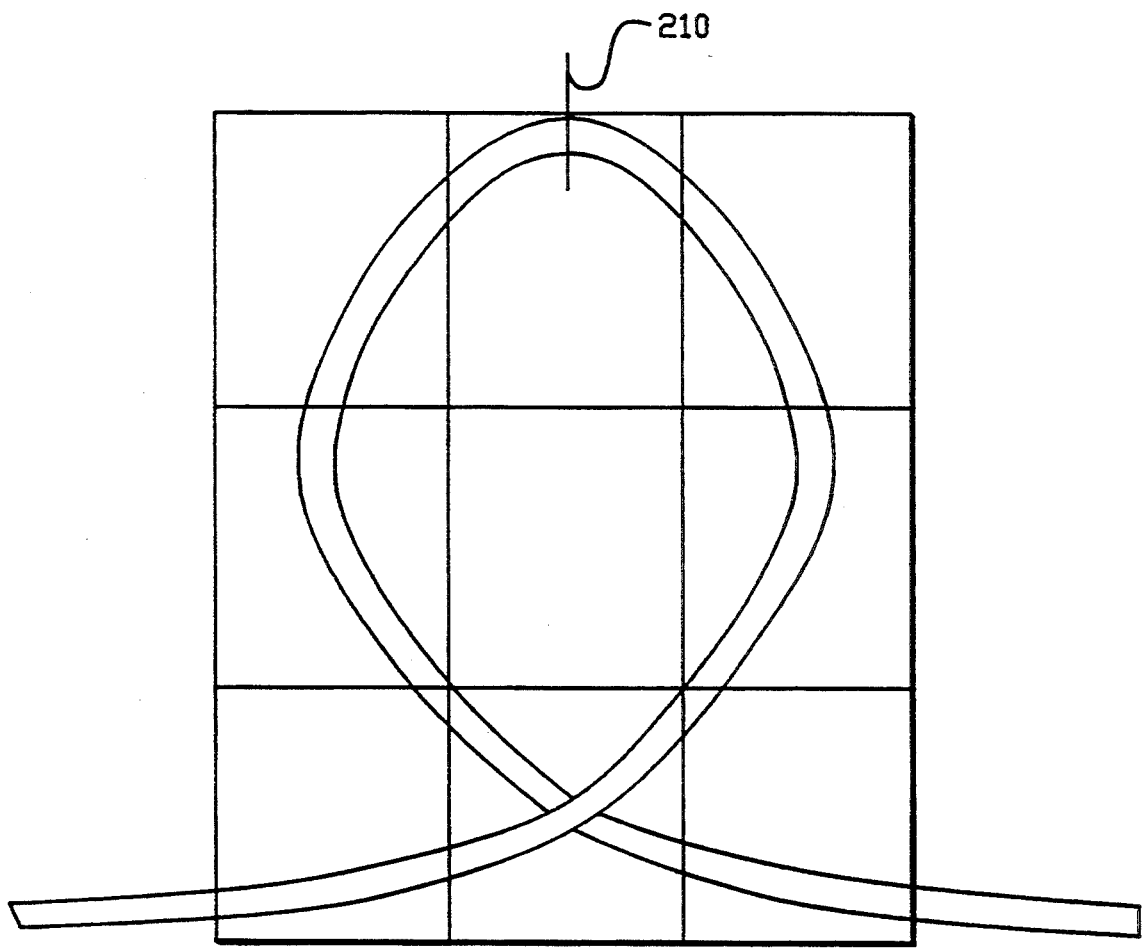
Figure 21:
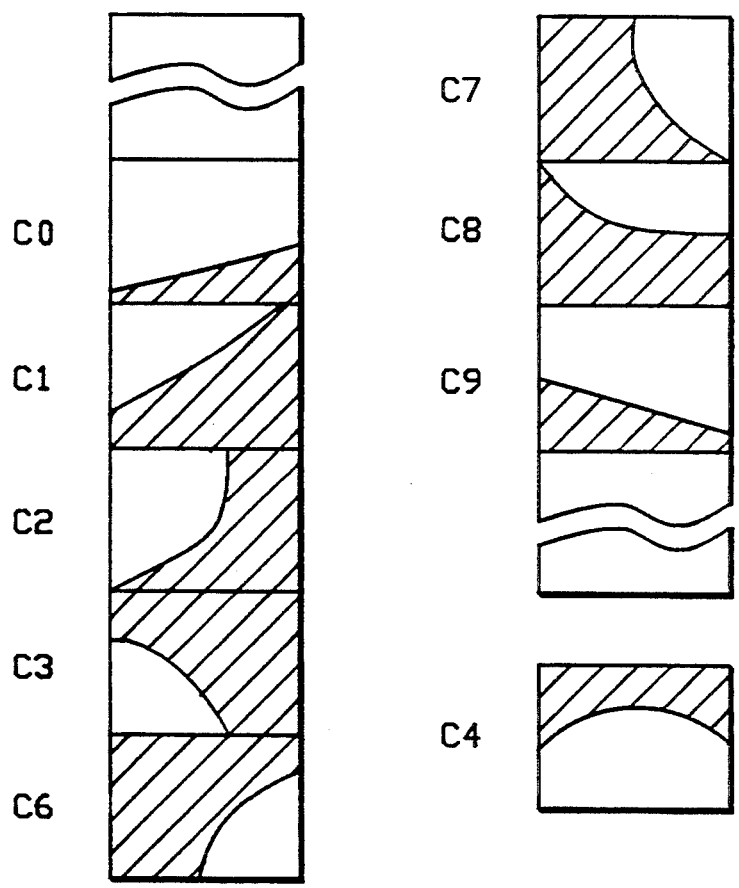
FIG. 21 shows an illustrative library of graphics blocks used to define path segments of the graphics path block of FIGS. 20A-C.

A library of collision blocks is stored in the ROM 58. FIG. 21 shows a collection of collision blocks which may be used to keep a character on the overlap path of FIG. 20A. The playfield path is divided into multiple graphics path blocks. FIG. 20B shows the graphics path blocks that contain the overlap loop.

As the character proceeds along the path, a record is maintained as to which graphics path block presently is being traversed by the character. A collision table such as that shown in FIG. 22 is used to make a cross-reference from the graphics block to a collision block. The collision blocks actually define the path segments followed by the character. The graphics path blocks are merely graphics, and they may or may not include actual images of the path segments defined by the collision blocks. As the character moves along the path, from one graphics path block to another, it follows a path defined by the individual path segments of the collision blocks referenced to the graphics path blocks through the collision table.

A novel feature of the present system is that cross-references from a graphics path block to a collision block can be made to be dependent upon the collision type information stored in the character status table. By changing the character collision type, a graphics path block can be made to reference a different collision block. Thus, the path segment followed by the character can be made to be dependent upon the status table information of the character.

Referring to FIG. 22, there is shown a collision table used to cross-reference path blocks to collision blocks. The table indicates a path block number in the first column. In the second and third columns it indicates the collision block(s) to which the path block is referenced. The references set forth in the second column are used if the character itself carries "A" type collision information, and the references in the third column are used if the character itself carries "B" collision type information. While the majority of the table references are the same regardless of the type (A or B) of collision information carried by the character, certain of the graphics path block cross-reference depend upon character collision type.

Specifically, graphics path block the G6, can cross-references either of two collision blocks c1 or c8 depending upon character collision type. Graphics block G11 cross-references to collision block c4 regardless of character collision type. The remaining graphics path blocks that make up the overlap path reference the same collision block regardless of character collision type. For example, graphics path block G5 is always cross-referenced to collision block c0, and graphics path block G12 is always cross-referenced to collision block c3.

Figure 23:
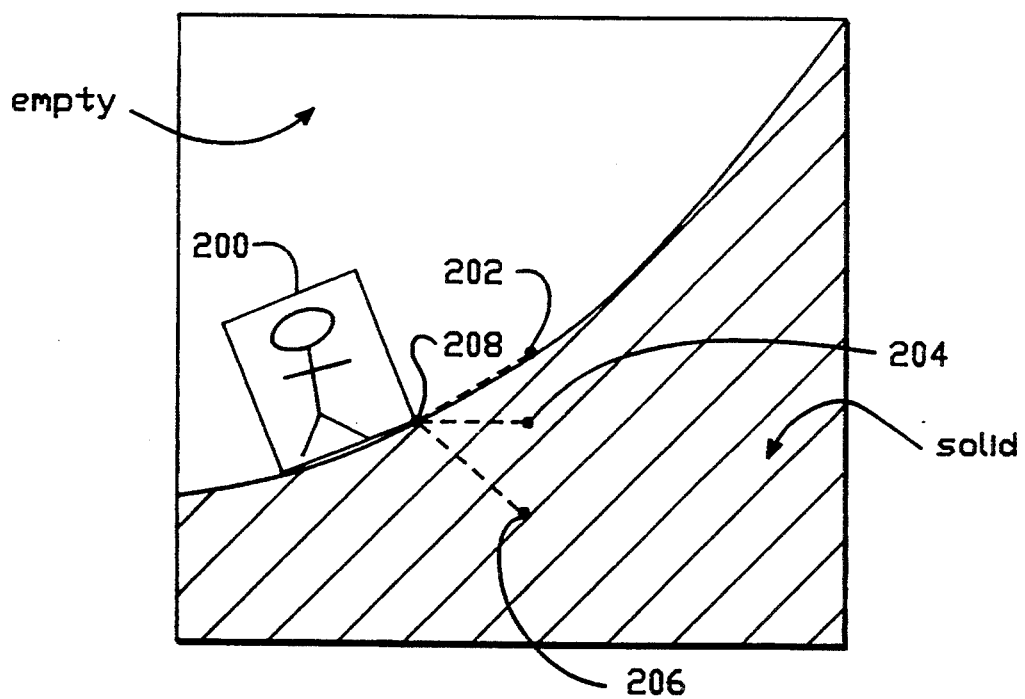
FIG. 23 is an enlarged view of one of the collision blocks of the library of FIG. 21 used to illustrate the process of locating the path segment defined by a collision block.

Referring to the illustrative drawing of FIG. 23, there is shown an enlarged view of collision block c1 of FIG. 21. Collision block c1 is referenced to graphics path block G6 when the character has A type collision information. Assuming that the character 200 advances along the path from left to right, it ascends as it traverses graphics path block G6. The actual movement of the character in the screen display as it traverses block G6 is controlled by reference to collision block c1. If the same character with type B collision information was to cross block G6 from right to left, then it would descend.

More specifically, there is shown a solid (shaded) region and an empty (unshaded) region within the collision block c1. The solid (collision) region is represented in digital form in ROM by the storage of prescribed logical information, for example, logical "1", and the empty (non-collision) region is represented by the storage of a different prescribed value, for example, logical "0". The boundary between the solid region and the empty region defines a path segment. As the character proceeds through graphics path block G6 with A type collision information, it follows the path segment defined in collision block c1. The path followed by the game character comprises a multiplicity of such path segments defined by different collision blocks in the library.

In FIG. 23, the outlines of a game character pattern are indicated by lines 200. As user commands direct the character 200 to move either left or right, a determination is made as to whether or not the character needs to move horizontally, diagonally, upward or downward in order to remain in contact with the path segment.

A user operating an input controller 72 or 74 would merely indicate that the character should move left or right by depressing the buttons labelled L or R. If, for example, the graphics controller, determines that the character has entered a graphics path block that references collision block c1 shown in FIG. 23 and the character has A type collision information, then the controller would use the path segment defined by block c1 to determine the precise character movement through the graphics path block. For example, assume that a user has commanded the character 200 in FIG. 23 to move from left to right. A determination is made as to whether or not the character should move horizontally to the right or diagonally upward to the right or diagonally downward to the right in order to remain on the path segment after the movement.

The method whereby the character movement along individual path segments is controlled involves keeping track of the current location of the game character within the collision block. A determination is made as to which one of several possible movements of the character would leave the character suspended in empty (non-collision) space, within a forbidden solid (collision) area or resting upon the path segment. The movement which would leave the character on the path segment is selected.

For example, still referring to FIG. 23, predefined test points 202, 204 and 206 are used to test the possibilities by determining whether a leading edge 208 of the character would be left on the path segment surface, in empty space or in a solid region. The stored logical bits indicating solid collision regions are regions that are forbidden to entry by the character. A movement of the character horizontally to point 204 would leave the character in a forbidden solid region; so that choice is out. A movement diagonally downward to the right to point 206 also would leave the character in a forbidden solid region; that choice is out as well. However, a movement diagonally upward to the right to point 202 would leave the character disposed directly on the path; so that option is selected.

It will be appreciated that the technique just described for locating the path segment within a collision block can use a similar set of test points for every collision block. This uniformity of technique facilitates high speed graphics and a high degree of flexibility in selecting and producing game paths. Moreover, the details of the technique, which includes keeping track of the offset (location) of the graphics path block in the playfield, will be understood by those skilled in the art and need not be described in detail herein.

At the apex of the overlap loop indicated by line 210 in FIG. 20B, a changing of character collision type information is performed in accordance with the process illustrated in the flow diagram of FIG. 24. That is, each time the character passes a region of the playfield in the vicinity of line 210, the character collision type is changed. If the character had been moving from right to left through graphics path block G11, then the type changes from A to B, and if the character had been moving from left to right through graphics path block G11 then the type changes from B to A. Thus, after the change, the character collision type is different from what it was before the change. For graphics block G11, a single collision block is cross-referenced regardless of character collision type since there is no overlapping of path segments and path is not dependent upon character direction.

Assume, for example, that a character enters the overlap loop from the left through graphics path block G5 and initially has collision type A. When the character traverses graphics path block G6 a reference is made to collision block c1. When the character reaches the apex of the graphics path block G11, the collision type carried by the character changes from A to B. As the character descends from left to right and passes again through graphics path block G6, this time, a reference is made to collision block c8. Thus, during the first traversal of graphics path block G6 one collision block is referenced, and during the second traversal another collision block is referenced.

Conversely, if the character were to initially enter the overlap loop from the right and initially have collision type B, then as it passed through graphics path block G6, a reference would be to collision block c8. As the character moved upwards and around the loop and crossed the region indicated by line 210 in graphics path block G11, the collision type information carried by the character would change from B to A. As the character descended and again traversed graphics path block G6, a reference would be made to collision block c1. It should be appreciated, that if the character were to move back and forth across the region indicated by a line 210, the collision type information carried by the character would continue to change back and forth between A and B.

The use of references to collision blocks that are dependent upon the collision type of a character advantageously permits the use of paths that cross over each other. Moreover, the use of references that depend upon character collision type are particularly useful where different collision blocks are to be invoked when the character approaches a particular path block from different directions.

Split Screen Competition Graphics

Split screen competition graphics advantageously provides two scrolling screens each of which can scroll over different parts of the same playfield. Character sprites in the two screens can move independently of each other on the two screens. This advantageously provides the opportunity for full competition between players on each independent scrolling screen. Moreover, both the upper and lower scrolling screens can contain the full amount of sprite graphics information. Since the two screens each occupy half of the screen area that was occupied in a single scroll screen mode, the images in the two scroll screens are vertically compressed or squeezed by a small amount. The scroll rate of each screen depends upon the rate at which each character traverses its screen. One character can be far ahead of the other character. Also, in a present embodiment, the two sprite characters can accumulate game points independently of each other.

The split screen mode overcomes limitations of the prior art. For example, FIGS. 25A–B illustrate a potential problem with earlier split screens: some playfield screen information is lost in going from single screen mode shown in FIG. 25A to the split screen mode shown in FIG. 25B. The large face graphics are an illustrative part of exemplary playfield graphics which is partially lost in the split screen mode. FIGS. 26A–B show another potential shortcoming of some earlier scroll competition games: competing characters can potentially disappear from view if they become separated by too much distance in the playfield.

FIG. 27A illustrates the single screen mode, and FIG. 27B illustrates the split-screen mode in accordance with the present invention. The two split screens in FIG. 27B are squeezed vertically as compared with the single screen in FIG. 27A. However, no information is lost in the split screen mode; all scroll and sprite information is present for use in each of the two screens which scroll independently. Moreover, the display never looses sight of either of the two sprite characters even if they become separated in the playfield.

Interlace Mode Control

Figure 29:
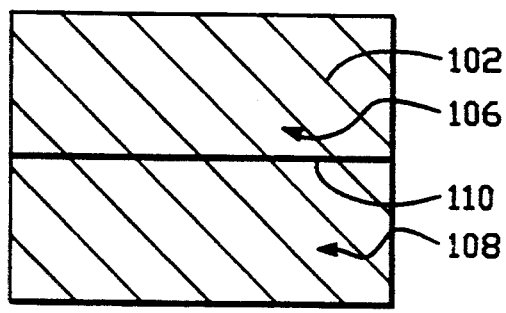
FIG. 29 illustrates an even scan frame.
Figure 30:
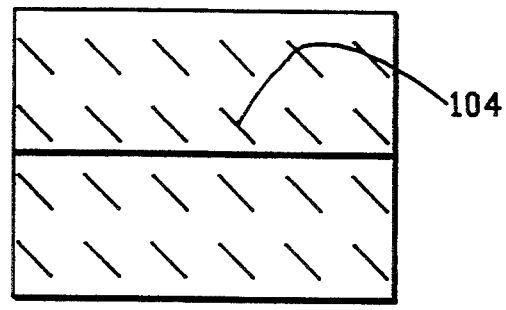
FIG. 30 illustrates an odd scan frame.
Figure 28:
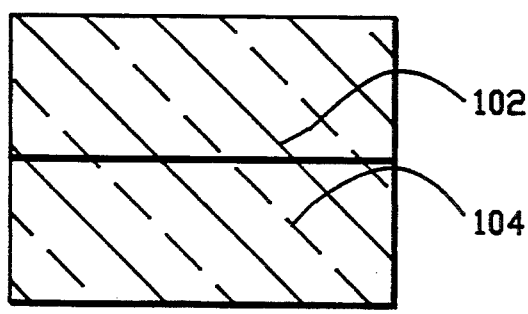
FIG. 28 illustrates an interlaced frame.

During operation in the interlace mode, an interlaced display field illustrated in FIG. 28 incides both even scan lines 102 indicated by solid diagonal lines and odd scan lines indicated by dashed horizontal lines 104. Interlace mode is a well-known mode of TV operation which will be understood by those skilled in the art. A complete interlaced display field is produced over the course of two scan frames. During an even scan frame indicated by FIG. 29 the even lines are traced. During an odd scan frame indicated by FIG. 30, the odd lines 104 are traced.

In split-screen mode, there is a top screen 106 and a bottom screen 108. The two screens are demarcated by a boundary 110 between them. Since the top screen 106 and the bottom screen 108 can depict different regions of the playfield and can depict different sprite characters, access must be made to different sprite graphic information and different graphic playfield information in order to render the two different playfields. In a current implementation, the memory storage requirements for maintenance of all of the sprite graphics information for both the top and the bottom playfields 106, 108 can be great. Consequently, in accordance with a current embodiment of the invention, a technique is employed to change the stored sprite graphics information in the course of a single even frame trace and to again change the sprite graphics information stored in the course of a single odd frame trace.

More specifically, referring to the illustrative of drawings of FIGS. 31A–D, there is shown a representation of four time segments of a single frame trace. The first segment shown in FIG. 31A represents retrace during which a vertical interrupt of the processor 44 is called. The second segment shown in FIG. 31B represents the screen trace of the top screen. The third segment illustrated in FIG. 31C represents a segment during which a horizontal interrupt of the processor 44 is called. The fourth segment indicated by FIG. 31D represents a time period during which the bottom screen is traced.

The timing diagram of FIG. 32 shows the time interval during which each of the above segments occurs. Each of the two frames used to generate a complete interlaced field is rendered in the course of 1/60 seconds (16 milliseconds). Thus, an entire interlaced field is generated in the course of 1/30 seconds (32 milliseconds). Referring to the timing diagram, during the first three milliseconds of the rendering of one frame, a vertical interrupt is called, as the beam retraces from the bottom right portion of the screen to the top left portion. During that time period, sprite graphics information for the top screen is transferred from RAM 42 to VRAM 45. During the next 6 milliseconds the top screen 106 is rendered using the stored graphics information. A horizontal interrupt is called right before the next one millisecond, and the screen is turned off so that no picture is generated. During this time period, sprite graphics information is transferred from RAM to VRAM for the bottom screen. Right before the last 6 milliseconds the screen is turned back on and the bottom screen 108 is rendered. It will be understood, of course, that the above-described process occurs for both the even frame and the odd frame. Thus, it occurs twice to render one complete interlaced field.

Figure 33B:
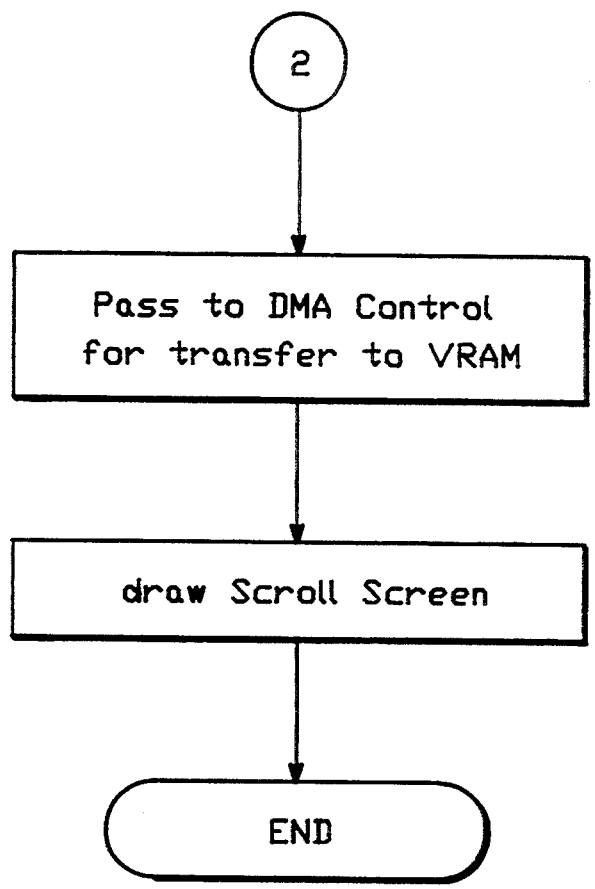
Figure 34:
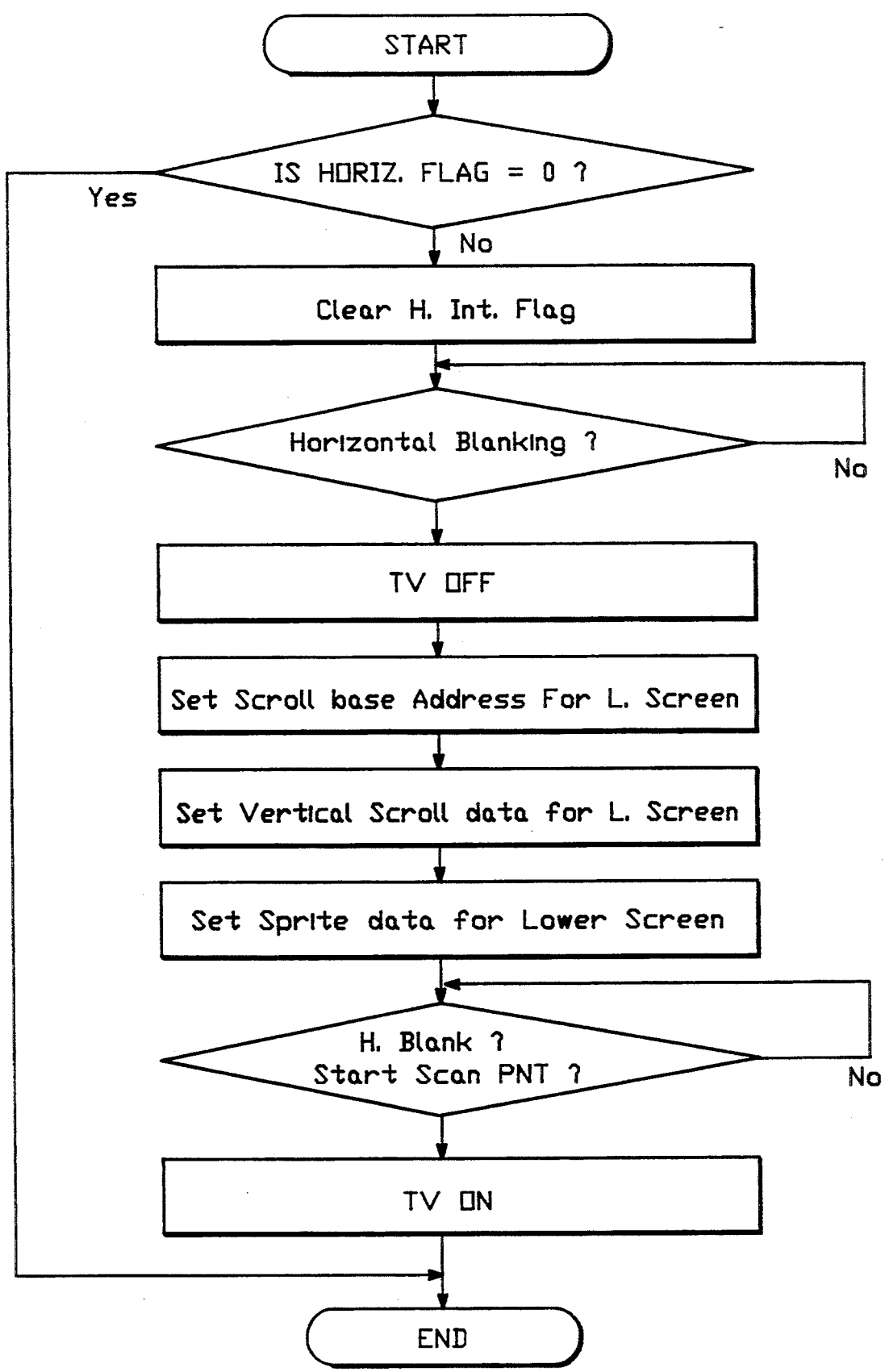
FIG. 34 illustrates a computer program used to control the exchange of graphics information during the rendering of a split screen display.

The illustrative drawings of FIGS. 33A–B and 34 provide flow diagrams that explain details of the graphics data transfers that occur during each of the two frames used to produce a single interlaced field.

Referring to the illustrative drawings of FIGS. 35 and 36, there is shown a single cell and a corresponding graphics pattern for use in interlace mode. The single cell comprises 8×16 dots. In rendering the graphic pattern of FIG. 25, rows 00, 08, 10, 18, 20, 28, 30 and 38 are rendered during the even trace frame, and the intervening rows 04, 0C, 14, 1C, 24, 2C 34, and 3C are rendered during the odd trace frame. It will be understood that the number of rows of dots that appear in both the top screen and in the bottom screen in the split screen mode is the same as would appear on the entire screen in a non-interlace mode. There are 224 rows of dots in each split screen. However, due to the fact that in interlace mode, dots are closer together, the images in the top and bottom split screens appear to be vertically squeezed. This is true for both scrolled playfields and for the sprites.

Overview Of The Multiple Player Cooperative Mode And Multiple Player Competition Mode In a current embodiment, a system in accordance with the present invention has two modes of operation: a cooperative mode and a competitive mode. In the cooperative mode, the first character responds to inputs applied to the first controller, and the second character follows the first character through the playfield. It can be said that the two game characters cooperate in that the first character leads the second character through the playfield. Not only does the second character follow the first character, but the second character also imitates the first character's movements. Thus, the first and second game characters both respond to inputs provided to the first controller with the second character following behind and seeming to imitate the first character.

FIGS. 37A–E are purely illustrative drawings used to explain the operation of the cooperative and competition modes. Each drawing shows a portion of a prescribed path through the playfield. As can be seen, the path includes hills and valleys. At one point, there is a trench. A platform (an "event") moves back and forth across the trench, as indicated by the arrows. In order for a game character to traverse the trench, the character must jump onto the platform and ride the platform across the trench and then jump off the platform on the other side of the trench. Jumping on to and off of the platform requires skill. This is the type of challenge that might cause difficulty for a novice player.

Figure 37C:
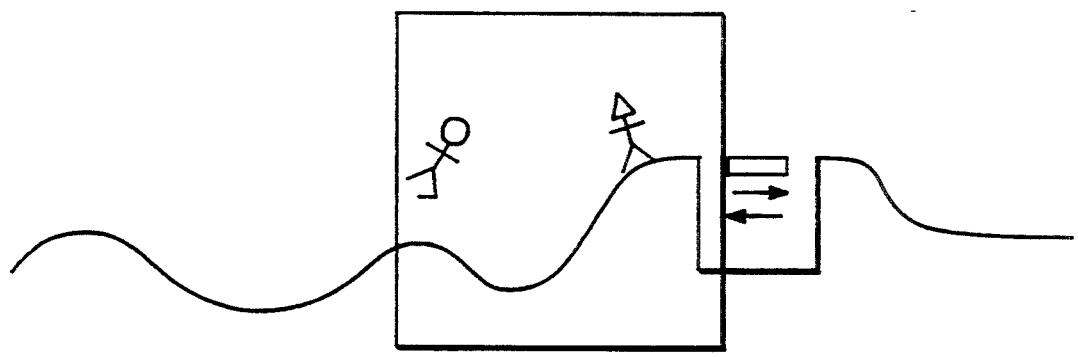

In FIGS. 37A–E, the triangle character is the first character controlled by the first controller, and the circle character is the second character which follows the first character in the cooperative mode. In FIG. 37A, the second character is following behind the first character. The box in FIG. 37A encloses the portion of the path which is then currently visible on the display screen. Thus, portions of the path to the right and to the left of the box are outside the screen display and are not visible to the game players.

Figure 37D:
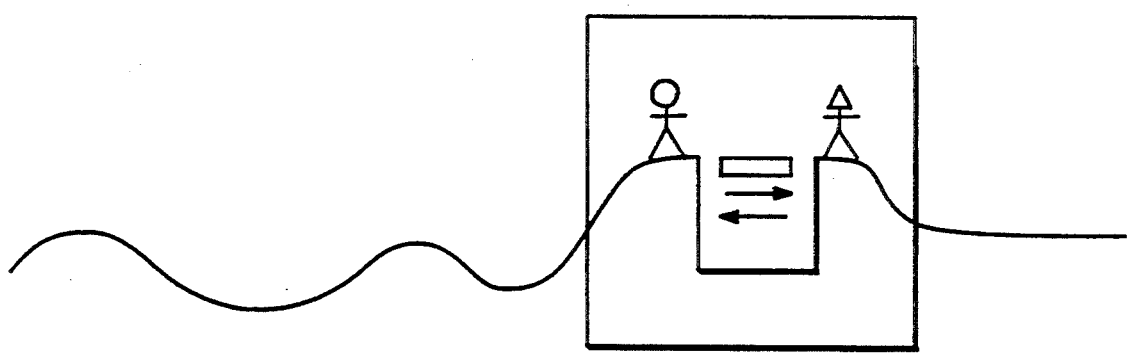
Figure 37E:
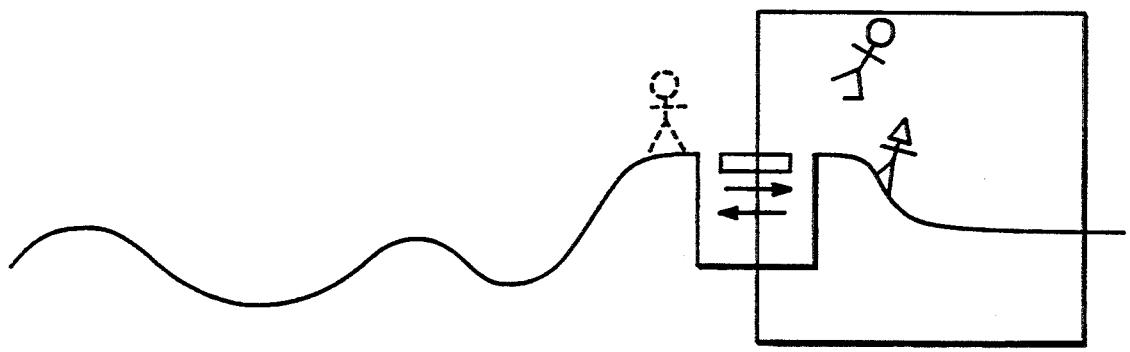

In FIG. 37B, the first and second characters have progressed to the right, and consequently, the portion of the path that is visible on-screen has changed. Also, the first character is shown to be jumping. In FIG. 37C, the first and second characters have progressed even further to the right as indicated by the location of the screen display on the playfield. In FIG. 37C, it can be seen that the second character is jumping just as the first character jumped previously. In cooperative mode, the jumping of the second character is responsive to the same jump command provided to the first controller that caused the first character to jump in FIG. 37B. In FIG. 37D, the first character is shown to have successfully traversed the trench. The second character is still on the left edge of the trench not having traversed it yet.

At this point, assume that a second player using the second controller has decided to begin control the movement of the second character as it attempts to traverse the trench. The second player provides an input to the second controller in an attempt to cause the second character to jump on to the platform. The game switches to the competition mode. Suppose the jump fails, as a result, in FIG. 37E, the first character has continued to progress, and the second character is left behind out of view. This is indicated by the screen display in which the first character is within the field of view, but the second character (indicated by dotted lines) is outside the field of view of the screen display. As a result, in the present embodiment action is halted, and the second character once again appears within the screen display located directly above the first character and begins to move downward as described below in relation to the computer program of FIG. 40.

In the competitive mode, each game character is under separate control of a different controller. The first game character responds to inputs applied to the first controller 72, and the second game character responds to inputs applied tot he second controller 74. The two game characters compete as they traverse the playfield.

In certain game environments, the distance that a game character progresses through a playfield depends upon the skill of the player operating a controller used to control the game character. A character controlled by a skilled player will progress farther because a skilled player can better overcome obstacles in the path of a character that he controls. As explained in the cooperative mode control section, the cooperative mode permits a novice player to take advantage of the skills of a more seasoned first player. The accomplished player can control the first character which, due to his skill, is able to make significant progress through the playfield. The second character also makes significant progress by following the first character and imitating its movements.

As explained below in the competition mode control and mode switching sections, the novice player can take active control of the second character by pressing buttons on the second controller. The system then operates in the competition mode in which each character is controlled by a separate controller. However, in the preferred embodiment, if the second player fails to operate the second controller for a prescribed period of time, such as ten seconds, then the system reverts again to the cooperative mode, and the second character once again follows the first character. Alternatively, if the second player continues to operate the second character controls, but the second character falls a prescribed distance behind the first character, such as so far behind as to not be visible on the screen, then the system will cause the second character to catch up with the first character, and the system will again revert to the cooperative mode.

Cooperative Mode Control

Referring to FIG. 38, there is shown a flow diagram for a computer program used to control the movement of the second game character in the cooperative mode. The flow diagram assumes that a first player has provided a series of commands to the first controller in order to control the movement of the first character through the playfield. In step 510, the first controller input data is read for that input data which was stored 16/60 seconds before. In step 512 a determination is made as to whether or not the stored input data indicates that the right button was activated. If it was then in step 514 of the second character sprite moves to the right on the screen display. In step 516 a determination is made as to whether the input data indicates that the left button was activated. If so, then in step 518 the character sprite moves to the left. In step 520 a determination is made as to whether the jump button was activated. If it was, then in step 522 the second character sprite jumps on-screen. In step 524, a determination is made as to whether or not the down button was activated. If it was, then in step 526 the character sprite is caused to crouch down. In step 528, a determination is made as to whether or not there is an object obstructing the path of the second character sprite. If there is, then in step 530 the second sprite attempts to jump over the object. That way, the second character tries to overcome obstacles in its path as it pursues the first character even if no first controller input was applied for that specific purpose.

In step 532 a determination is made as to whether or not there is any distance between the first and second characters. If there is, then the second character moves toward the first character dot by dot. The computer program represented by FIG. 38 is called every 1/60 seconds by an interrupt routine. The second character typically only has an opportunity to move a few dots before the routine is called again. Thus, before the second character can move very far in its effort to catch up with the first character, a determination is made as to whether there are additional first character movements to be imitated by the second character.

The second character sprite appears to follow the first character sprite, mimicking his moves. If however, the first character sprite remains stationary, the second character sprite, through the operation of step 534 will catch up with him. The result is that the first character leads the way through the playfield under control of the first controller. The second character follows close enough behind so that both the first and second characters are visible on the screen display. If the first character fails to move, then the second character moves toward the first character, either to the right or to the left as necessary. This routine runs periodically when the system is in the cooperative mode.

Competition Mode Control

In the competition mode, the first controller 72 is used to control the movement of the first character sprite, and the second controller 74 is used to control the movement of the second character sprite. The players operating the first and second controllers compete with each other as the first and second characters traverse the playfield. The competition, for example, can involve attempts to traverse the playfield the fastest while accumulating the most points.

Mode Switching

Figure 39:
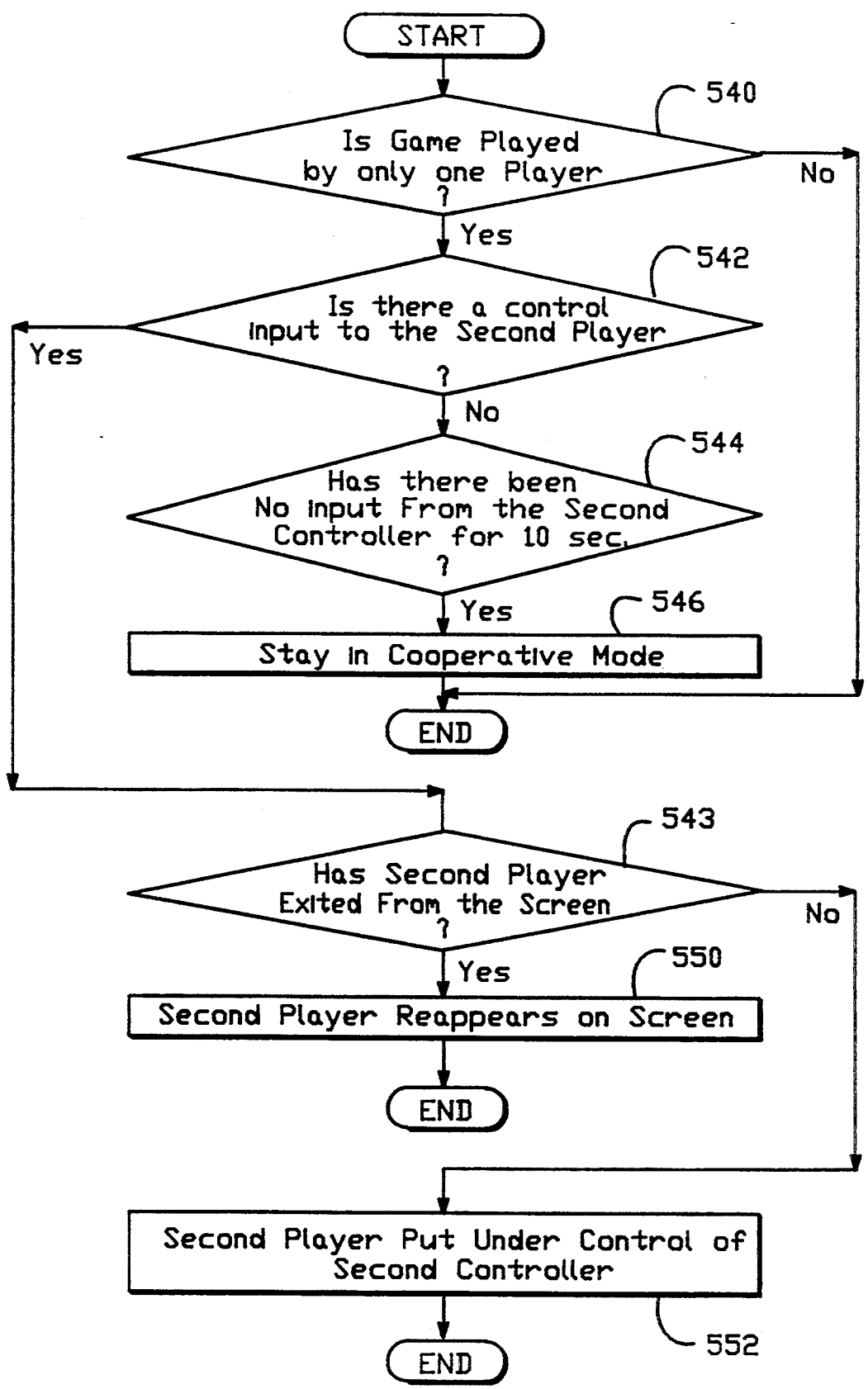
FIG. 39 is a flow diagram of a computer program used to determine whether the cooperative mode or the competitive mode is to be used by the second game character.

Referring to the illustrative drawing of FIG. 39, there is shown a flow diagram for a computer program used to determine whether the cooperative mode or the competition mode is to be used. In step 540, a determination is made as to whether the game has been set to be controlled by only one player. If it has, then the game is automatically put into the cooperative mode, and in step 542 a determination is made as to whether there has been a control input applied to the second controller. If not, then in step 544 a determination is made as to whether there has been no input from the second controller for more than ten seconds. If there has been no input for more than ten seconds, then the game remains in the cooperative mode as indicated by step 546.

If in step 542 there has been a control input to the second controller then, in step 543, a determination is made as to whether or not the second character sprite has disappeared from the screen. If it has, then the second character sprite is caused to return into view on the screen in step 550 and the game remains in the cooperative mode. If in step 543 it is determined that the second character sprite has not disappeared from the screen, then in step 552 the second character sprite is placed under control of the second controller and the game reverts to the competitive mode.

The program of FIG. 39 periodically executes. The result is that the game will revert to the cooperative mode if the second character falls sufficiently behind the first character to disappear from the screen or the second player fails to operate the second controller for a prescribed time period. Conversely, the game will revert to the competitive mode if the second player operates the second controller and the second character is still visible on the screen.

The flow diagram of FIG. 40 represents a computer program used to move the second character sprite back into view after it has fallen far behind the first sprite and has disappeared from the screen. The program of FIG. 40 is used in the competitive mode to be sure that the first and second character sprites remain visible together on the screen display. The objective is to not allow the character controlled by the novice player to fall too far behind the main character.

In step 560 a determination is made as to whether or not the initial flag is set to one. The initial flag indicates that the subsequent four steps already have been taken. The initial flag is part of the sprite status information for the second character sprite. In step 562, an image pattern is selected with the second character sprite shown to be flying through the air. In step 564, the horizontal position of the second sprite is selected to match that of the first sprite. Typically the controller 40 keeps the first character sprite centered on the screen. Thus, the second character also is horizontally centered on the screen. The first character is frozen on the screen, and all screen action is frozen except for the movement of the second character. In step 566, the vertical position of the second character sprite is selected to be 192 dots above the first character. In step 568, the initial flag is set to one, and in step 570 the second character begins to move slowly downward. In step 572, a determination is made as to whether or not the second character has landed on a game path. If he has not then the cycle repeats until he lands, and in step 574, the second character is displayed in a standing position. At this point, the program illustrated in FIG. 38 begins running, and the steps illustrated in that program are followed. The program in FIG. 39 controls switching between the cooperative mode and the competitive mode.

Overview of Playfield Position Exchange Graphics present invention includes a split screen mode of operation described above. The screen display is split into two equal sized screen displays, one above the other in which game characters can compete against each other. Each of the two screens can display different regions of the same playfield. A top screen display displays a first game character. A bottom screen display displays a second game character. The first character is controlled by a first user who operates a first controller. The second character is controlled by a second user who operates a second controller. The top and bottom screens can display different regions of the playfield. The top screen display scrolls independently of the bottom screen display.

In certain video games, for example, competing players operate different controllers which control the movement of different characters through a playfield. Two players may compete by trying to have their characters race through the playfield trying to accumulate points by surmounting obstacles, slaying enemies or gathering "magical rings", for example The player whose character crosses the largest chunk of playfield or accumulates the most points wins.

Referring to FIG. 41, for example, the top screen may display the playfield region labelled A, and the bottom screen may display the playfield region labelled B. In this example, regions A and B overlap. Referring to the illustrative drawings of FIG. 41, there is shown a split screen display with the top screen illustrating a first character in playfield region A and a bottom screen region with a second character in playfield region B. Within the playfield there is an exchange object which we will refer to as a teleport box. When one of the character sprites comes to within a prescribed proximity of the exchange object, the positions of the two characters in the playfield and much of their status information is exchanged. In this manner, a character that has fallen behind can interchange playfield positions with another character. The exchange object, therefore, adds new strategy considerations to the game competition.

In FIG. 41, the first character in the top screen has fallen behind the second character in the bottom screen. This is apparent from the terrain in the two screen displays. The characters move left to right as they progress through the playfield. In the top screen, the first character has not yet crossed the small hill. In the bottom screen, the second character has just crossed the same hill. An exchange object is present in the top screen. When the first character contacts it, as described below in connection with the computer program flow diagram of FIGS. 43A-B, the playfield positions of the first and second characters are reversed as shown in FIG. 42.

Exchange Object Control

Referring to FIGS. 43A-B, in step 610 a determination is made as to whether either game character has accessed an exchange object. If so, then an exchange is made of certain current status information for the first and second characters in step 612. Not all status information is exchanged, and for example, the information exchanged does not include information that is unique to either character such as the graphic patterns that determine its appearance. For example, the sprite pattern numbers which represents the sprite animation are not exchanged. During step 612, character sprite status information is actually transferred between a first character status information buffer in RAM 42 and a second character status information buffer in the RAM 42.

In step 614 the master number and pattern number for each player is initialized so that the first and second characters will be shown in standing positions following the exchange. In step 616 scroll pattern information is shifted between the top screen scroll buffer and the bottom screen scroll buffer. In step 618 the action set numbers are exchanged between a top screen scroll buffer and a bottom screen scroll buffer. The action set numbers represent the screens actually stored in RAM 42 at any given time. It will be recalled that in the present embodiment a playfield is sixty screens horizontally and eight screens vertically as shown in FIG. 2. Each playfield has a number of regions which are identified by action set numbers. A playfield region designated by an action set number is larger than a portion of a playfield that can be displayed on a single split or whole screen at any given moment. In a present embodiment, multiple action set number regions are stored in RAM 42 at any given time, although only one screen at a time is displayed. This additional playfield display information is stored in RAM 42 so as to accommodate rapid character movements or changes in direction. For example, if the character suddenly moves to a new playfield region that previously had not been displayed, then new playfield region display information will be readily available in the RAM 42. There will be no need to transfer new playfield display information from the ROM 58 to the RAM 42. As a consequence, there will be no perceptible delay or discontinuity as the character moves to the new playfield region.

In step 620 priority information is exchanged between the characters. In step 622, flags are adjusted for certain events. More specifically, there are events such as the passage of a character past an A/B collision switch which causes a change in the character's collision information. There also are events such as the character having entered a region of the playfield which requires the character to take a special appearance. For example, in a present embodiment, one of the screens is known as "casino night". While the first character is in the casino night screen it takes the shape of a pinball since casino night is in the form of pinball machine. Thus, pattern information used to produce a pinball image is used to depict the character as it traverses the casino night screen. The flags that are set in step 622 are the flags that keep track of such special or special events. One of ordinary skill in the art will appreciate that there may be other special event flags to be set depending upon the idiosyncrasies of a particular playfield or video game.

In step 624, modes known as barrier and invincible are set for the characters. In a present embodiment, the setting of these modes for one of the characters calls a routine which causes a character to be displayed with a certain graphic which depicts the character as being invincible. When a character is in the invincible mode, for example, it cannot be as readily "killed". In step 626, a determination is made as to whether the first character is spinning. If it is, and then the first character hit size is decreased in step 628. In step 630 a determination is made as to whether the second charaacter is spinning. If so, then in 632 the second player's hit size is decreased. Once again, one of ordinary skill in the art will appreciate that there may be other special modes depending upon the particular features of the game.

Referring to FIG. 43B in step 634, a determination is made as to whether or not a character is riding on an "event". In a present embodiment, an event is a term that designates a playfield object or obstacle such as a moving platform or a shuttle loop. When a character rides on an event, then special consideration must be made for character operation during that time period. For example, if a character is crossing a shuttle loop then its control will depend upon offset table entries rather than collision information.

If the first character is riding on an event, then in step 636 the first character ride flag is set. In step 638 a determination is made as to whether or not the second character is riding on an event. If so, then in step 640 the second character's ride flag is set. In step 642 a flag is set to inactivate the TV screen display while the scroll fields are interchanged. In step 644 the set action stop flags are set for both characters so that both characters pause. In step 646 an interrupt wait is set for a count of sixty-three. In steps 648 and 650 the count is decremented, and in 652, when the count has completed and the scroll screens have been updated, the TV screen display is turned back on. The TV screen display is temporarily turned off both to accommodate the information exchange and to give the human players time to realize that an exchange has just taken place. In step 654 the action flags for the two characters are once again set.

FIG. 44 illustrates a teleport box. In a present embodiment, the teleport box is the exchange object visible on screen. When a character contacts the box by jumping on it, it "breaks" the box. Before the character contacts it, the box appears as in FIG. 44, and after the character contacts it and "breaks" it, it appears as in FIG. 45. The box center floats upward until it reaches a certain height. When it reaches that height, the exchange described above takes place. Thus, game players know when an exchange is about to occur.

While a particular embodiment of the invention has been described in detail, various modifications to the preferred embodiment can be made without departing from the spirit and scope of the invention. For example, the shuttle loop might define a path that twist through more or less than 360 degrees. Thus, the invention is limited only by the appended claims.

What is claimed is:

1. A method for controlling the appearance of a video game character as the character traverses a path displayed on a display screen; wherein the method is used in a video game system which includes a graphics controller, digital memory and the display screen, the method comprising the steps of:

displaying a banked path segment in which the game character is displayed sideways at at least one location on the banked path;

storing in the digital memory multiple sprite patterns representative of the appearance of the character at different locations on the banked path as the character traverses the banked path;

tracking character location on the banked path as the character traverses the banked path;

retrieving from the digital memory the sprite pattern that is representative of the appearance of the character at a respective location on the banked path; and displaying the character with an appearance dictated by the retrieved sprite pattern as the character traverses the respective location on the banked path.

2. The method of claim 1 wherein the character is displayed upright at either end of the banked path and is displayed upside down part-way through the banked path.

3. The method of claim 1 wherein the character is displayed partially obscured from view during traversal of at least one segment of the banked path.

4. The method of claim 1 wherein said step of tracking includes tracking a horizontal component of progress of the character along the banked path.

5. The method of claim 1 wherein said step of tracking includes tracking a horizontal component of progress of the character along the banked path; and including the further step of:

storing in the digital memory cross-references between the horizontal component of progress of the character along the banked path and possible locations of the character on the display screen.

6. The method of claim 1 wherein said step of tracking includes tracking a horizontal component of progress of the character along the banked path; and including the further step of:

storing in the digital memory a cross-reference between the horizontal component of progress of the character along the banked path and location of the character on the display screen; and wherein the stored cross-reference accounts for offset of the displayed character from the banked path, the offset resulting in the character being displayed extending above the path when the character is displayed upright, the offset resulting in the character being displayed extending beneath the path when the character is displayed upside down.

7. The method of claim 1 including the further step of:

storing priority information for the character and for the banked path such that such stored priority information results in the character being displayed partially obscured from view behind the banked path during traversal of at least one segment of the banked path.

8. The method of claim 1 including the further step of enforcing a minimum character speed as a prerequisite to traversal of the banked path.

9. The method of claim 1 including the further step of enforcing a minimum character speed as a prerequisite to traversal of the banked path by storing in the digital memory information concerning the instantaneous character speed and by accessing that stored speed information as the character enters the banked path and by precluding character entry onto the banked path if the character speed does not meet the minimum.

10. A method for controlling the appearance of a video game character as the character traverses a path displayed on a display screen; wherein the method is used in a video game system which includes a graphics controller, digital memory and the display screen, the method comprising the steps of:

displaying a corkscrew path segment which twists through 360 degrees and in which the game character is displayed upright at either end of the corkscrew path and is displayed upside down part-way through the corkscrew path;

storing in the digital memory multiple sprite patterns representative of the appearance of the character at different locations on the corkscrew path as the character traverses the corkscrew path;

storing in the digital memory cross-references between the horizontal component of progress of the character along the corkscrew path and individual stored sprite patterns;

storing in the digital memory cross-references between the horizontal component of progress of the character along the corkscrew path and possible locations of the character on the display screen;

tracking character location on the corkscrew path as the character traverses the corkscrew path; and displaying the character with an appearance dictated by the stored sprite patterns as the character traverses the corkscrew path.

* * * * *